(12) United States Patent
Ruffin et al.

(10) Patent No.: US 6,526,387 B1
(45) Date of Patent: Feb. 25, 2003

(54) METHOD, SYSTEM AND PROGRAM PRODUCT FOR DETERMINING THE VALUE OF A PROPOSED TECHNOLOGY MODIFICATION

(75) Inventors: Michael Ruffin, Calumet Park, IL (US); Joseph L. Temple, III, Hurley, NY (US); Kristin R. Jayaram, Fishkill, NY (US); Timothy I. Morrison, Tillson, NY (US); Allen H. Preston, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/386,046

(22) Filed: Aug. 30, 1999

Related U.S. Application Data

(62) Division of application No. 09/183,961, filed on Nov. 2, 1998, now Pat. No. 6,249,769.

(51) Int. Cl.[7] .............................................. G06F 17/60
(52) U.S. Cl. .................................. 705/7; 705/1; 705/37
(58) Field of Search ............................ 705/7, 8, 10, 26, 705/400, 37; 700/28; 702/186; 706/51, 59

(56) References Cited

U.S. PATENT DOCUMENTS

| | | | | |
|---|---|---|---|---|
| 4,887,206 A | * | 12/1989 | Natarajan | 705/29 |
| 5,006,998 A | | 4/1991 | Yasunobu et al. | 364/513 |
| 5,276,775 A | * | 1/1994 | Meng | 706/51 |
| 5,680,305 A | | 10/1997 | Apgar | 364/401 R |
| 5,724,262 A | * | 3/1998 | Ghahramani | 702/186 |
| 5,745,880 A | * | 4/1998 | Strothmann | 705/7 |
| 5,793,632 A | * | 8/1998 | Fad et al. | 705/400 |
| 5,960,417 A | * | 9/1999 | Pan et al. | 705/400 |
| 5,963,939 A | * | 10/1999 | McCann et al. | 707/4 |
| 6,004,015 A | * | 12/1999 | Watanabe et al. | 700/28 |

FOREIGN PATENT DOCUMENTS

JP    411184785 A  *  7/1999

OTHER PUBLICATIONS

Stein, Tom; Not just ERP anymore; Dec. 1, 1997; Informationweek n659 pp: 18–24; dialog copy pp. 1–5.*

* cited by examiner

Primary Examiner—Thomas A. Dixon
(74) Attorney, Agent, or Firm—Floyd A. Gonzalez; Marc A. Ehrlich

(57) ABSTRACT

A method, system and program product for determining the value to an enterprise of a proposed technology modification is presented herein. The information technology resources of an enterprise are partitioned into segments along any number of various lines such as business process, geography, etc. The partitioning creates one or more sets of partitioned segments. Within a given segment the resources are profiled in accordance with the information technology priorities of the enterprise and mapped against the complexity of the proposed modification to derive an opportunity score. The opportunity scores for the profiled segments are examined to determine if the partitioning has been effective and if not, the process is repeated. Once an effective partitioning has been effected the opportunity scores of the segments indicate a measure of the respective value of the proposed modification within each segment.

27 Claims, 12 Drawing Sheets

METHOD, SYSTEM AND PROGRAM PRODUCT FOR DETERMINING THE VALUE OF A PROPOSED TECHNOLOGY MODIFICATION

CROSS-REFERENCE TO RELATED APPLICATIONS

The present invention is a divisional of U.S. patent application Ser. No. 09/183,961 entitled "Method, System and Program Product For Evaluating The Business Solution Deliverables" by Temple et al, assigned to the present assignee and filed on Nov. 2, 1998 now U.S. Pat. No. 6,249,769. This patent application is incorporated herein by reference.

FIELD OF THE INVENTION

The present invention relates to the field of business solutions development, and in particular to the provision of an automated method, system and program product for evaluating particular aspects of a business enterprise and business-related requirements of the enterprise which may, for example, include information technology (IT) requirements, and efficiently developing a business solution deliverables such as an IT system proposal based upon an articulated set of those requirements. Advantageously, the present invention may be utilized to modify an existing business environment (such as an existing IT infrastructure) to more closely coincide with articulated business requirements or to develop a new business system (such as a new IT infrastructure) coincident with those requirements.

BACKGROUND OF THE INVENTION

The proliferation of information processing solutions available to a business enterprise has proven advantageous to most modern enterprises, providing an opportunity to apply the benefits of computer processing technology to most every area of the enterprise and accordingly to better service customers in a more efficient manner. However, the value provided by these myriad advances in information technology has come at a cost, specifically the burden of managing the many disparate IT solutions that have been integrated into different areas of the typical business enterprise.

As IT expands throughout the enterprise, demand for IT consultant services has concomitantly surged to address the burgeoning complexities of managing the corporate IT infrastructure. Within this growing market the complexities inherent in effectively identifying pertinent IT solutions required by a business customer and mapping those IT needs to the skills and solutions offered by a particular solution provider, the so-called Business Solutions Assessment (BSA) process, has proven to be an equally complicated endeavor, mismanagement of which may translate directly into lost business opportunities for a solution provider. As the types of IT solutions available to the business customer continually expand, IT solution providers are increasingly challenged by encounters with potential customers utilizing technologies which are outside the traditional areas supported by the provider. Alternatively, the success of a multi-faceted solutions provider may be impeded by limitations in the solutions experience of a particular marketing representative in contact with a potential customer. For example, a customer who has clearly defined needs in the area of business intelligence (BI) may not be well-served by a marketing professional with experience in the area of server consolidation solutions notwithstanding the fact that his company does in fact provide BI solutions. Consequently, a successful BSA implementation would provide readily accessible support to enable a marketing professional to draw upon the entire breadth of the solution set offered by his company.

In the typical BSA scenario, the potential customer faces a number of IT challenges, some more pressing than others, in various areas of IT. It would be advantageous to enable a solutions provider representative to prioritize these needs by assessing their impact on the customer's business and to map these prioritized needs against the solutions provided by his/her company to determine which needs best matched the solutions provided thereby. At the onset of the BSA undertaking is an initial customer engagement process. During this critical period, the ability to establish credibility with the customer, and to ensure that all parties involved have a clear understanding of the business benefits which will result from the engagement and their relevance to the needs of the customer is of paramount importance. Ultimately, it is in both the customer's and provider's best business interest to qualify the project prior to investing too much resource in an endeavor. Accordingly, the ideal solution assessment process will enable the customer to make informed decision about the proffered solutions early in a project, while establishing the proper expectations, roles and responsibilities for all parties involved. Often this will entail a proof of concept undertaking to demonstrate the feasibility of the project and the creation of a high-level workplan for the project.

The ideal BSA process addresses questions regarding the risk to be shared between the customer and the solution provider, the resources required, the approximate cost in money and time and the reasonably expected benefits of the endeavor. Currently, these issues are addressed in an ad-hoc fashion based upon the skills of the particular marketing team and the business knowledge and experience of the customer involved in the undertaking. It is clear that a well-articulated approach to this process would better serve all parties involved.

Other solutions have proposed the use of computer-based expert system to provide a ready interface for a consultation client. For example, U.S. Pat. No. 5,006,998 entitled Computer System With Easy Input Means For Consultation, teaches a computer system suitable for consultation in such a case where plans are to be created while a concurrent dialogue is undertaken with a client asking for advice. It distinguishes over prior art system which required that a full set of customer inputs were initially secured prior to providing a response to the customer, which suffer the disadvantage of not having facilities for addressing the customers questions which may arise in providing input to the system. The patent further teaches the inclusion of advertisements within the series of interactive inquiries addressed to the client which may additionally be responded to by the client. Accordingly, the patent is focused on the facilitation of the interaction between a computer and a client, but fails to teach the implementation of a system or method for engagement with a client wherein increasingly detailed client data regarding a potential IT solution is iteratively applied against a knowledge base to enable generation an IT business solution proposal. In other areas, U.S. Pat. No. 5,680,305 covering a System And Method For Evaluating Real Estate, teaches providing a quantitative evaluation of a real estate interest owned by a business entity via the processing of numerical data assigned to various real estate valuations such as utilization indices, and revenues of the entity owning the property to calculate a score attributable to the property, which reflects a quantitative evaluation of the real estate. This patent is a specific expert system tailored to address the intricacies of the real estate industry to place a numerical valuation on the on a given property, it does not address the complex issues involved in exploring the various facets of a customer's IT infrastructure as well as the business environment and needs goals of that customer to devise IT solutions which best meet the determined needs.

From the foregoing it can be seen that a need exists for an IT-based solution which addresses these and other related issues concerning the BSA. Such a solution would use IT in the form of an automate set of electronic questionnaires tied to modelling tools and a knowledge base to assist in addressing these issues, and provide a manageable framework to a systematic BSA process. More specifically, the ideal automated solution should enable the implementation of a series of assessment processes designed to ensure that the proper analysis is conducted in the course of undertaking a Business Solution Assessment.

While the present invention deals specifically with an automated method, system and product for providing IT solution proposals via the provision of an inventive BSA process flow, it is contemplated herein that such inventive techniques can be and are readily applied to the determination of any type of business solution offered by a solutions provider, be it in the area IT, plant security, personnel administration, financial services, or site maintenance services, etc. The sole limitation of the present inventive process is the ability of the solution provider to glean the appropriate information from a potential customer at the appropriate point in the customer engagement, and to apply the obtained information in a meaningful manner to its set of available solutions and the data derived from previous customer engagements which is stored in its knowledgebase.

SUMMARY OF THE INVENTION

The foregoing problems and shortcomings of the prior art are addressed and further advantageous solutions are provided by the present invention wherein is provided a method, system and program product for generating business solution deliverables including a business solution proposal for a business entity based upon a set of business related requirements which is collected from a business entity via an interactive process and is sequentially analyzed to determine the appropriate business solutions therefor. In a preferred embodiment, the present invention entails the successive logical generation of a set of information processing requirements as well as the determination, based upon the generated set of processing requirements of IT solutions optimized to best match the generated set of requirements.

In accordance with an aspect of the present invention facilities are provided for qualifying a prospective customer for whom business solution services may be performed. An automated checklist tool is used to ensure that the prospective customer is briefed on relevant available solution services. The tool comprises a database including sets of solution services and products associated with different types of business service or solution scenarios. In a preferred embodiment the tool further comprises services for providing a sampling of the beneficial results which the customer may expect from the proffered solution. This feature assists in securing participation from potential customers.

Once a prospective customer has been properly qualified, a further aspect of the present invention provides data gathering facilities for gathering (for example) information processing requirements coincident with the IT system objectives of an enterprise. These data gathering facilities may be coupled to the aforementioned sampling services which require that a certain sub-set of overlapping data is secured from the customer. In an embodiment of the invention, the data gathering facilities are used to identify "islands" or partitions, comprising a plurality of elements of an existing IT environment which are grouped together by virtue of one or more common features among these elements. For example, such common features may include physical proximity, budget, applications or data utilized by these elements, or groups of users accessing these elements.

Input is solicited from the qualified customer via a profile template to identify, for each partition, information regarding the current state of each partition and any problems that have been identified for the partition, as well as the future information processing objectives for each partition.

A profile assessment logic tool provides a logical score assigned to each partition based upon the profile-based input. The logical score is an approximation of value that the system owner may derive from enhancements made to each partition. The profile assessment logic further provides an indication relating to the facility with which already available business solutions may be utilized in accordance with problems and objectives articulated by the owner via the profile input. Partitions are then ranked in accordance these logical scores and indications.

For each ranked partition a correction logic device provides an assessment of whether the partitions have been properly identified. For example, the correction logic will determine whether the amount of work to be done to address the objectives and problems in an identified partition is too great in scope, such that the partition should be further divided into smaller or different partitions. In this iterative manner the partitioning process is continually refined.

In an embodiment, the correction logic further determines whether the results of the profile assessment logic produces a clearly ranked set of partitions. If the results of the profile assessment logic is not a clearly ranked set of partitions, the profile template may need further refinement to generate a more clearly articulated ranked set of partitions.

In a further embodiment, all of the data captured from the system owner via the profile template is added to a database comprising data from a set of such customers. Logic means may be further provided for analyzing the accumulated data to align the business requirements of a present customer with one or more existing customers from the database. Aligning may be accomplished in accordance with various articulated parameters.

The customer is prompted to address questions on a detailed input template for each of the ranked partitions. The answers and the opportunity identified within each of the ranked partitions are each provided to an opportunity tool set comprising logic tools such as sizers, proposal generators, financial tools, work assessment tools, planning tools and architectural templates, each of which may be custom tools or standardized software packages, for determining factors such as architecture, the work plan and the financial business case associated with enhancements recommended for a particular partition. The detailed questionnaire is implemented such that the answers thereto provide the input to the entire set of tools comprising the opportunity tool set.

The opportunity tool set generates business solution deliverables including a proposal for the enhancement of the partition in accordance with the requirements articulated by the customer in an efficient manner so as to elicit the customer's objectives and address them in as few steps as possible.

In a further embodiment, each deliverable and all data by the opportunity tool set and during the entire BSA process is added to a database which may be used as a repository for model solutions which may be used by the opportunity tool set in generating future deliverables.

BRIEF DESCRIPTION OF THE DRAWINGS

The subject matter which is regarded as the invention is particularly pointed out and distinctly claimed at the conclusion of the specification. The foregoing, as well as other features and advantages of the invention will be apparent from the following detailed description in conjunction with the accompanying drawings, in which:

DETAILED DESCRIPTION OF THE PREFERRED EMBODIMENT OF THE INVENTION

During the course of the ensuing description reference will be made to inventive systems, methods and program products for devising an IT solution for an external customer which will be represented as a business enterprise seeking to consolidate its base of server computers via a so-called "server consolidation process". In this particular implementation a customer implementing a number of different server types within their enterprise will be seeking to reduce their total number of machines preferably by consolidating certain workloads onto the most efficient server platform therefor. However, it will be understood by those of skill in the art that such inventive features as are described herein may be readily applied to other such situations, including without limitation, use by an internal IT department of an enterprise to more effectively service its internal customers. Moreover, the services offered to a qualified customer may take to form of network computing, electronic business (e-business) applications, enterprise resource planning (ERP) application provision, enterprise business analysis (EBA) provision or any other pertinent IT solution services which may be of interest to a customer. Finally, although the detailed description will encompass inventive techniques for implementing a business solutions assessment process related to the IT needs of a customer, the present invention may be applied to the provision of any other type of business solution which may or may not include the implementation of IT solutions. As previously noted it is envisioned that the present method, system and program product enable a solution assessment for determining business solutions related to any and all aspects of a business enterprise and for generating deliverables including solution proposals therefor.

Figure 1:
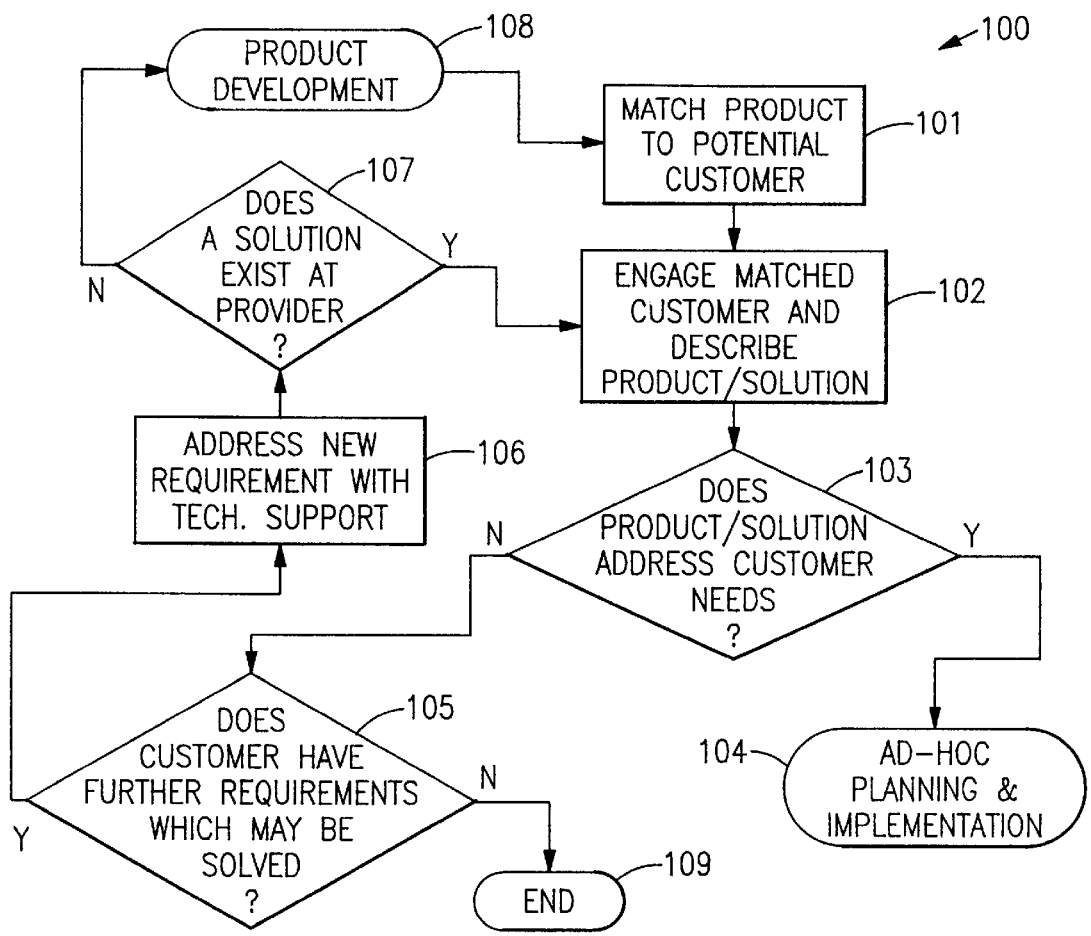
FIG. 1 illustrates an overview of the business solution development process for a typical IT solution provider.

To better appreciate the problem addressed by the present invention, reference may be had to FIG. 1 wherein is illustrated an overview of a solution development process 100 which may undertaken by a traditional IT solution provider.

Initially, the provider will have a particular product or preferred solution which it will attempt to sell. The provider's representative, at this point, will attempt to discern an appropriate customer set with which to match the proffered solution 101. Once identified, the representative will engage a potential customer or customers, often by a mass or direct mail or telephone solicitation campaign, and describe the proffered solution 102. The customer will at this point provide feedback based upon his/her on-going IT requirements and it is at this point 103 determined whether the proffered solution matches the customers IT requirements. If there is a match the provider and customer engage in an ad-hoc series 104 of planning and implementation steps, the regimentation and automation of which are addressed in detail in the present invention.

Most often the matching determination 103 reveals that the proffered solution does not precisely correspond to the customers IT requirements. In such instances, the process leads to an analysis of whether the customer has further IT requirements which may be addressed by the provider using the provider's then-existing set of solutions and services 105. If not, the customer engagement process is ended 109. Alternatively, if there are problems identified within the scope of the provider's current offerings, the appropriate technical support personnel are contacted 106 to determine whether a viable solution exists or can be adapted from existing products and/or services at the provider 107. If such solutions exist the customer is again engaged 102 with the more specific solution and the process is repeated. Alteratively, if the technical staff determines 107 that the appropriate solution for the customer is not available, this negative determination may, if the potential revenue warranted, trigger a development step 108 wherein the provider develops the appropriate solutions to address the identified IT problems of the customer which leads to a new engagement cycle in step 101 with the newly developed solutions.

As can be readily appreciated from the foregoing, this process 100 is fraught with a great degree of imprecision. At any step in the process the customer engagement may result in failure for a variety of reasons including, for example, limitations of the provider representative's knowledge and applicability of its solution portfolio, or delays and misstarts in the project planning and implementation process.

With the foregoing in mind we now turn to a high-level overview of the present invention wherein is provided a solution in the form of a tool comprising an articulated set of processes and systems for logically assessing IT solution opportunities based upon engagements between the solution provider and a potential customer, for securing the appropriate information from both the customer and from the IT solution provider to efficiently determine appropriate solutions for the customer and to generate the associated business deliverables such as solution proposals in the areas identified by the tool.

Figure 2:
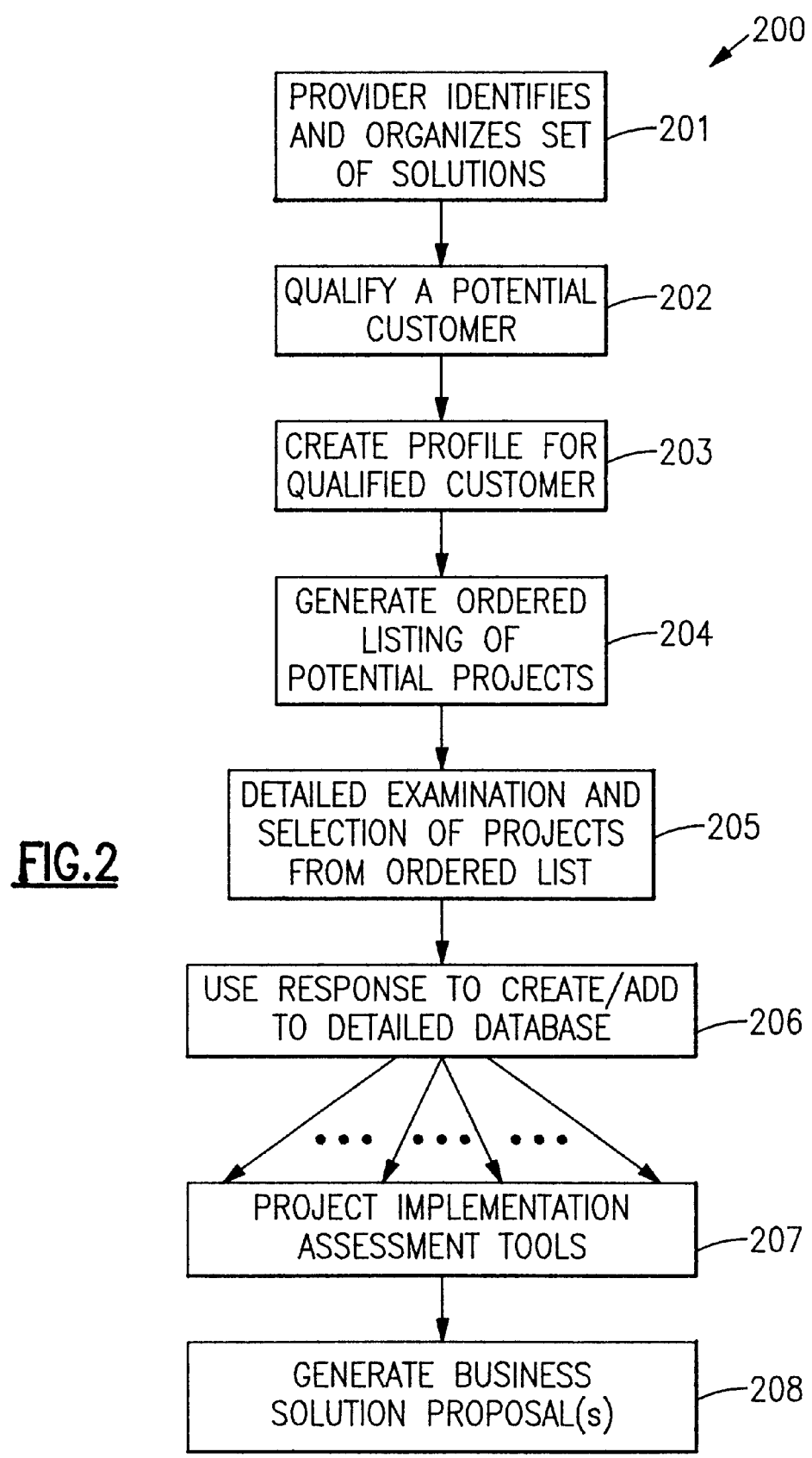
FIG. 2 provides a detailed flow diagram representing the inventive process business solution assessment including problem assessment and solution development for an IT design service such as server consolidation.

Turning now to FIG. 2 we are presented with a flow diagram 200 which represents an overview of the present inventive process, system and program product. The basis of the diagram 200 is an extensive logical itemization of the step-wise process which is to be undertaken by the IT solution provider to sequentially move from the qualification of a potential IT customer to the provision business solution deliverables including solution proposals including IT solutions therefor.

The first step 201 entails an organization by the provider of the set of solutions offered thereby. Implicit in this step is the notion that, in the case of large, multifaceted solution provider, no single individual will fully appreciate the potential scope of all offered solutions. Accordingly, reliance is placed upon a base of knowledge, preferably embodied in one or more computer databases, built upon real customer experience and industry data to readily apply aspects of the multiple offered solutions to new customer scenarios. Subsequent descriptions provided herein will further explore the use of such an expert system knowledge base.

Next, in step 202, based upon the set of solutions offered by the provider, a qualification process is undertaken to glean a potential customer's relevant interest, knowledge, and capabilities in the area of an exemplary proffered solution offered by the provider. The qualification process is a relatively non-intrusive process characterized by telephonic, Internet or mail-based surveys with the ultimate objective of identifying the set of customers with an interest in proceeding through the BSA process for a particular solution offering. In certain instances, to better secure the interest of the potential customer, certain tools may be employed to provide the potential customer with a sampling of the benefits likely to be derived from participation in the BSA process as well as identifying for the customer some shortcomings of their present IT environment.

When a customer is qualified in step 202, the solution provider thereafter engages the customer directly to create a customer profile 203. Creation of the customer profile is enabled via a tool which preferably takes the form of a computerized questionnaire which may be supplemented with answers received from the customer in the qualification process 202.

Through the tool, the customer is prompted to identify so-called "islands of IT" or partitioned segments of their IT infrastructure organized along the lines of various criterion such as workload, geography, technology etc. within their organization which are well-known to them. Further analysis of these "islands" will enable the solution provider to potentially isolate the islands and address them in a manner that best accommodates the interests of both the customer and the provider in a "divide and conquer fashion". The result of this analysis is an ordered listing of potential projects 204 to be undertaken by the solution provider. An aspect of the ordering process will further provide the ability to verify whether the ordering properly reflects the real world benefits of undertaking each of the ranked solutions and for re-generating and refining the list if it is determined that the ordering is not accurate. Further implementation details for the profiling step 203 and the creation of the ordered list 204 will be provided subsequently herein.

The ordered list is examined and one or more potential projects are selected for further investigation. Some or all of the information gathered at the profiling step 203 may be used in the detailed examination step 205.

The detailed examination step 205, which is also implemented via a computer program includes a more detailed inquiries are of the customer regarding the selected portions of the ordered list 204. The customer's responses are added to the responses elicited in profiling step 203 resulting in the generation of (or addition to) a detailed database 206 addressing the selected projects.

The detailed data gathered in the database 206 is next used as an input to a variety of project implementation assessment tools 207 such as workload sizers, financial analysis tools and proposal generation tools some of which are readily commercially available and others which form part of the present inventive techniques and will be further described subsequently herein.

Finally, the process culminates in step 208 with the generation of a business deliverable which preferably includes a formal solution proposal for the customer.

Figure 3:
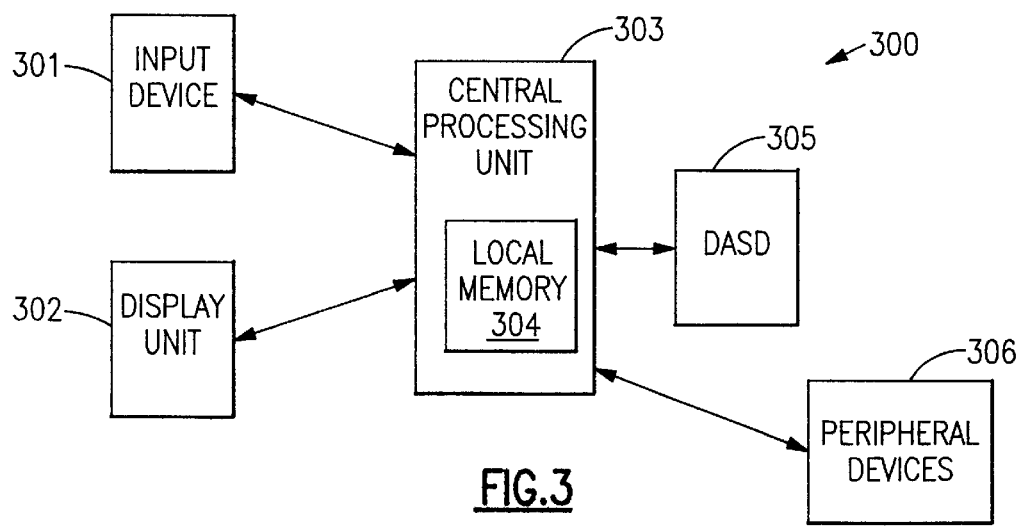
FIG. 3 illustrates a typical data processing environment wherein the present invention may be practiced.

The present invention relates to processes and systems for enabling the foregoing analysis. In a preferred implementation, the system is embodied in a data processing system such as that depicted as item 300 in FIG. 3. The system includes components typically associated with conventional data processing systems including without limitation an input device 301 such as a keyboard or other such input apparatus, and a display unit 302, both coupled either locally or via a network connection to a central processing unit (CPU) 303 for exchanging information therewith. The display unit 302 may be used to present to the customer the various surveys, and questionnaires required to elicit information from the customer, and the input device is utilized to gather from the customer responsive information required for implementing the inventive processes presented herein. The CPU 303 includes a local memory element 304 for storing a limited set of commands and data and is further coupled to a storage device 305 such as a direct access storage device (DASD) for storing and retrieving information required for the processing of commands and data at the CPU. Finally, the CPU may be further coupled either directly or remotely to other peripheral devices 306 which may include additional computer systems via local or wide area networks and the Internet, and which may further include such peripheral devices as printers, facsimile machines, scanners, network connection devices, tape drive units, etc.

In conjunction with the data processing system 300, the BSA undertaking as described here is implemented by successively adding increasingly detailed customer information to a database which may be retained in the storage area 305 of the system. The data is processed by one or more programs executed by the CPU 303 which are designed to elicit customer data and to analyze the proffered data against various models and previously stored data related to prior customer solutions to implement the BSA process as will be subsequently described herein. Accordingly, the BSA process interrelates these programs and data to present customized solutions closely matching the customer's IT objectives.

Figure 4:
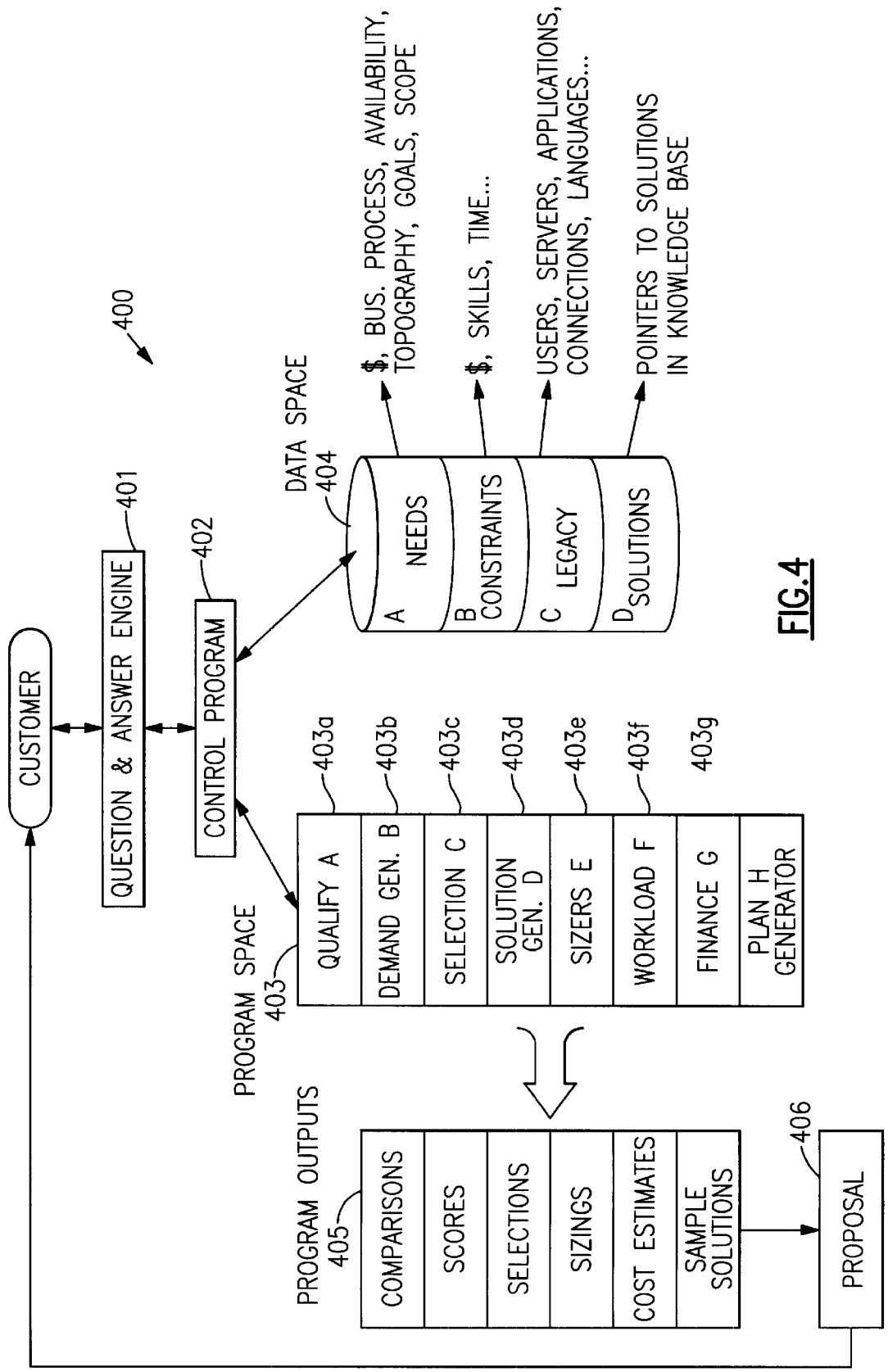
FIG. 4 depicts the functional interrelationship of data and processes implemented during the inventive business solution assessment.

In FIG. 4 a graphical representation 400 of the interrelationship of these programs and data is presented. This representation 400 will serve as an overview upon which the details of each stage of the process provided in FIG. 2 will be understood. Turning now to FIG. 4 we see that the customer interacts with the question and answer engine 401 which presents the various questionnaires to the customer and provides the customer's response to the computer system 300. The question and answer engine 401 is coupled to a control program 402 which in turn is coupled to a program space 403 and a data space 404 which include sub spaces 403 A–H and 404 A–D respectively. The control program 402 governs the flow of the BSA operations including the presentation of questions and the retrieval of answers from the customer through the question and answer engine 401 as well as the processing of the received data via the execution of programs 403 A–H stored in the program space which utilize data from and store data in the data space 404 and which generate the various program outputs 405 ultimately culminating in the generation of solution deliverables including a solution proposal 406 which is provided to the customer. Each of the particular programs 403 A–H, data spaces 404 A–D and outputs will be further described in detail herein. Accordingly, with this general background in place we now turn to consider the detailed implementation of each of the programs with their associated data in the undertaking of a BSA process.

Figure 5:
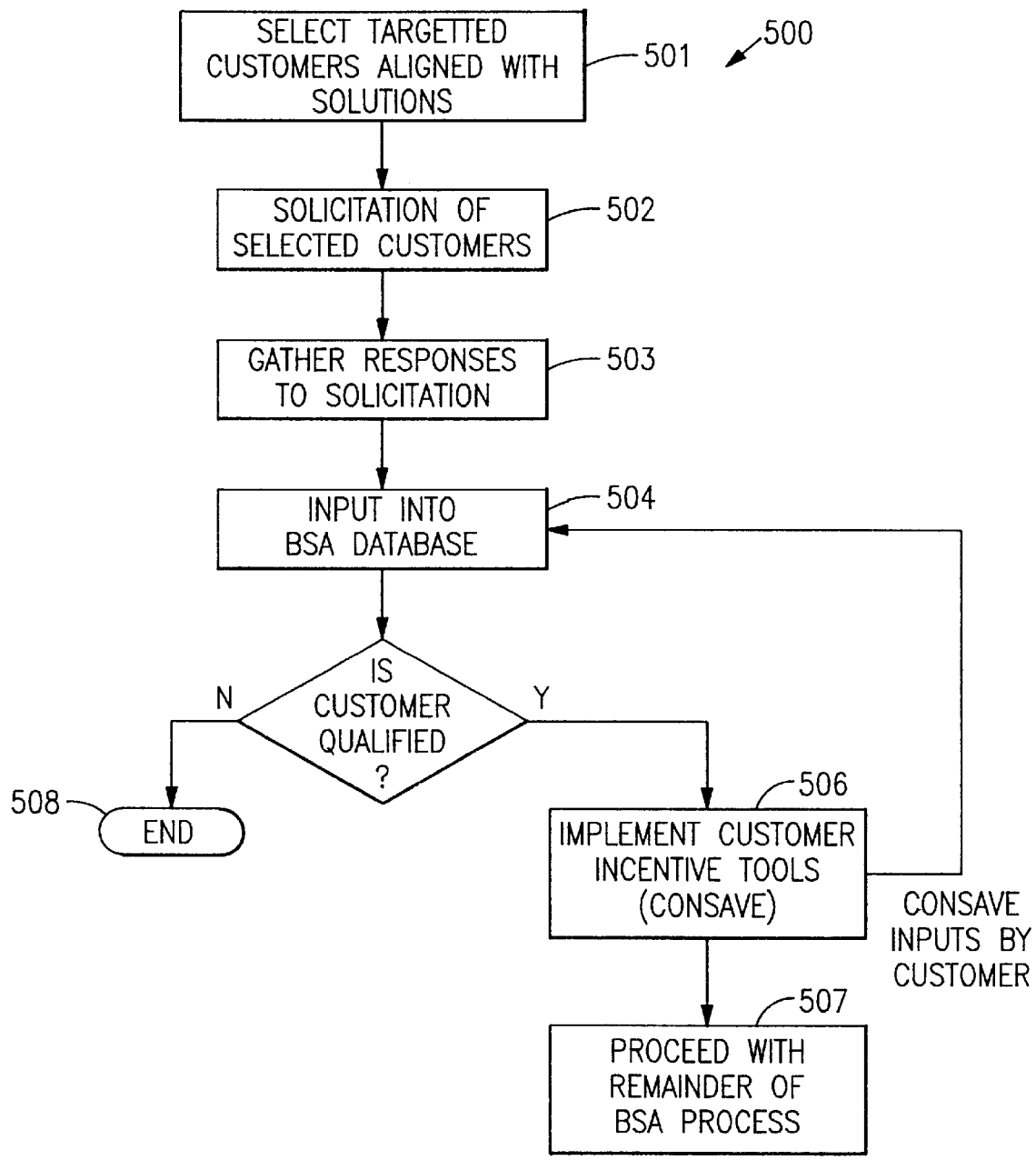
FIG. 5 illustrates the customer qualification process portion of the business solution assessment.

FIG. 5 illustrates a more detailed view of the customer qualification process 500 previously identified as steps 201–202 in FIG. 2. The provider, having organized and identified its IT solutions in step 201, proceeds to select target customers aligned with the various organized solutions offerings in step 501. The determination of whether a particular customer aligns with a proffered solution may be based upon the type of industry in which the customer does business or upon the size of a particular IT environment. For example, a server consolidation effort with an objective of consolidating many small to mid-sized servers onto a larger mainframe server would not target small businesses with modest-sized IT environments.

The targeted customers are solicited via marketing campaigns which preferably involve techniques such as telephonic surveys, mail-based or on-line questionnaires etc. 502 all seeking to elicit a from the potential customer, responses 503, which at a high-level will enable the provider to determine whether the customer is sufficiently interested, knowledgeable and properly situated to benefit from the proffered IT solution.

The responses 503 are input to a BSA database 504 which may be implemented as a single database table or grouping of tables and which is illustratively depicted as a portion of data space 404. It is these tables 504 which serve as the growing repository of detailed information derived throughout the BSA process 200 that will eventually be used to generated potential customer solution and will further be used to model potential solutions for future customer as will subsequently be described.

This determination process 500 then proceeds to the qualification step 505, which in a preferred embodiment is characterized by a computerized mechanism whereby a user's answers to the previously conducted survey or questionnaire are mapped against a checklist which serves to remind the provider representative to conduct certain related briefings and to elicit certain requisite information prior to proceeding further into the BSA process. For example, in qualifying a consolidation customer, the questionnaire may include queries as to the type of consolidation project to be done, i.e., hardware, application, database or other, it may also seek to ascertain whether the customer has determined a platform for the consolidation and whether the customer has selected applications for that platform. It will determine whether the customer has been briefed on the relevant technologies available from the provider and whether any outstanding technical issues remain. An illustrative list of inquiries which may be made during the qualification process 500 is provided below, however it will be understood that the qualification process serves to assist the provider's representative in deciding if a BSA is required or whether further marketing activities (see for example step 105–109 in FIG. 1) would be more appropriate at this time. It will consequently be readily appreciated that the actual approach utilized to arrive at this determination will depend to a large degree on the circumstances of the particular opportunity.

TABLE 1

Sample Qualification Questionnaire:

What type of consolidation?
Application/LAN Data/Database/
Hardware/Other
Has the customer decided on a target platform?
Has the customer selected application(s)?
ISV/Custom/Mixed?
Has the customer been briefed on our technologies?
Do outstanding technical issues exist?
Who is the customer's sponsor?
Does the customer have budgetary constraints?
Does the customer have a basic comprehension of the BSA?
Does the customer have a start date for the project?
Has the customer set a production date?
How will charges for the BSA be handled?

Upon successfully qualifying a potential customer, it may be valuable to further incent the customer to participate in the BSA through the provision of an illustration of potential benefits which may be expected based upon participation in the BSA. Accordingly, the use of a software tool 506 such as the savings from consolidation (CONSAVE) tool may offer a potential qualified participant a glimpse at the advantages of undertaking a consolidation BSA. Upon implementation of the incentive-based tool 506, the process continues to further BSA process steps 507. In the event that a customer is determined to lack the requisite qualifications with which to undertake the BSA process, the engagement is ended 508.

Figure 6:
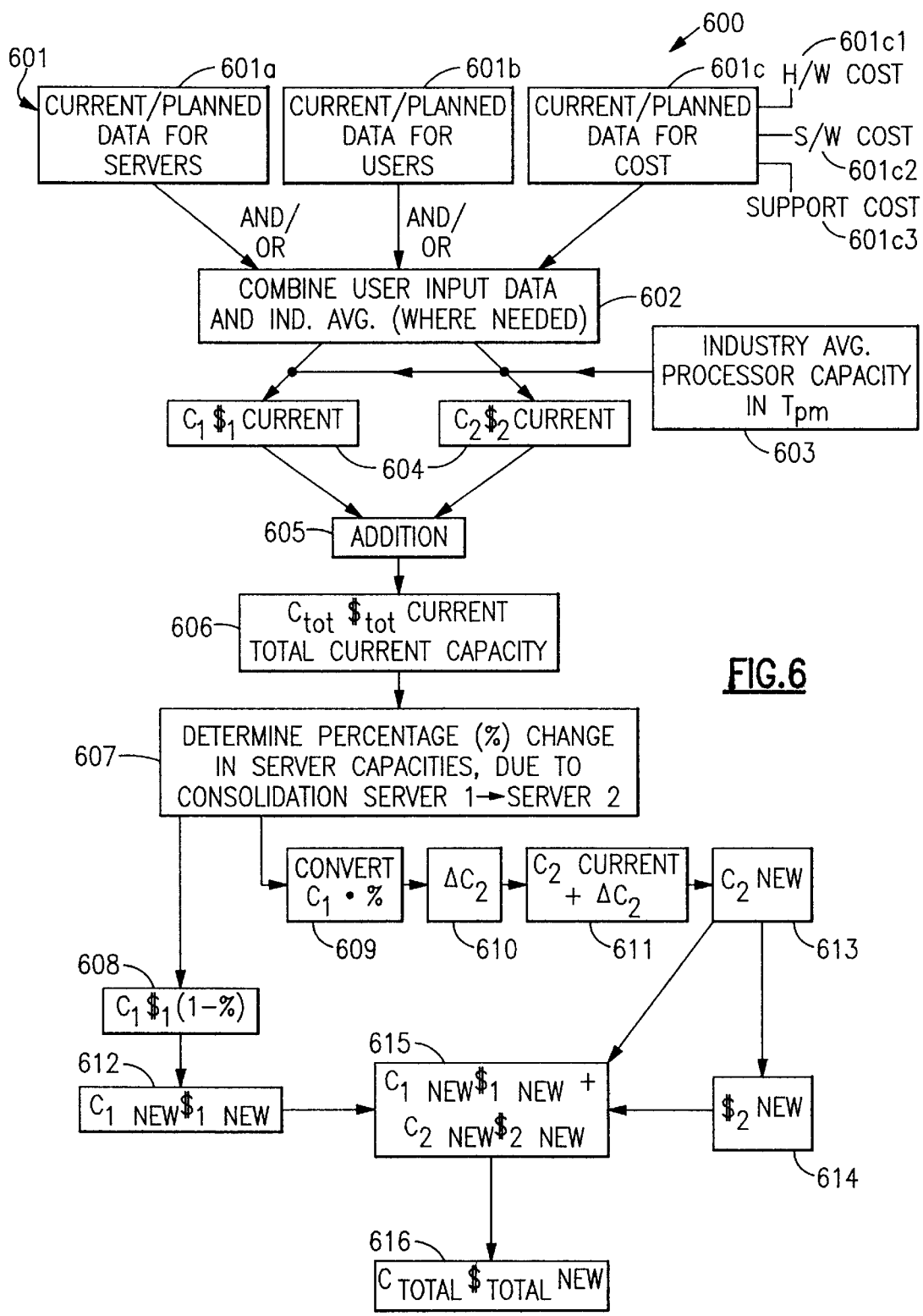
FIG. 6 depicts a detailed process flow for the consolidations savings tool.

FIG. 6 provides a closer look at the function of the CONSAVE tool 600 utilized in step 506 of FIG. 5. In step 601 the user inputs the current and planned information regarding their use of different type of servers (i.e., UNIX, Windows NT, or S/390) this information may entail any or all of the numbers of machines for each server type 601a, the number of users per each server type 601b of the cost associated with running each server type 601c. Furthermore, the cost 601c associated with the use of each server type is further divided into the cost associated with the hardware 601c1, software 601c2 and support 601c3 of each server type.

The user may choose to enter data for one or more of the number 601a, users 601b, or cost 601c information in any combination. The tool will utilize the user-supplied information and will further provide the remaining (not user-provided) inputs via reference to industry supplied averages for the "blank" input values based upon the user-supplied values in step 602. For example, if a user supplies the number 601a of current and projected machines for each server type, but leaves the users 601b and costs 601c fields blank, the tool will fill in these blanks using available industry averages 602 premised on the number of machines per server type as supplied by the user 601a.

The tool further provides an industry average of processing capacity per each server type 603 in terms of transactions per minute (TPM).

Upon providing the pertinent server type information (601a–601c and 602) and the capacity information 603, the tool next derives the current processing capacity and cost per server type 604. In an enterprise comprising two server types (for example a UNIX server and an S/390 server), the results may be expressed as $C_1\$_1$ (current) and $C_2\$_2$ (current) (604). Wherein the prefix "C" represents the capacity data for each server and the prefix "$" represents the cost data for each server. The addition of these measurements 605 provides the total current capacity 606 as $C_{tot}\$_{tot}$ (current)

The user next makes the assumption (for illustrative purposes) that the server consolidation will proceed from type 1 (i.e., UNIX) servers to type 2 (i.e., S/390) servers which determination will be based upon an examination of the workloads the user is implementing on each server type. The assumption is stated in terms of a percentage (%) of capacity to be migrated from server type 1 to server type 2 607. Based upon the proposed conversion percentage the tool will calculate the remaining 608 cost and capacity for server type 1 after this migration as $C_1\$_1 *(1-\%)$. These values represent the post-migration capacity and cost for server type 1 expressed as $C_1\$_1$ (new) 612. Additionally, the capacity of server type 1 is subjected to a sliding scale algorithm for expressing the server type 1 capacity to be migrated in terms of server type 2 capacity 609. The particular techniques implemented by the assignee have been provided at various technical conferences, however they are by no means the only mechanism for providing such a conversion between server type capacities. Those of skill in the art will readily recognize that various algorithms many of which are readily available may be employed to achieve this same conversion.

The capacity (i.e., TPM) for the server types are derived from industry averages. Inherent in these industry average TPM metrics is the premise that within a particular server type the TPM metric is a reasonable indicator of relative processing capacity, such that, for example, within a set of distributed UNIX servers, machines with similar TPM numbers exhibit roughly the same processing capacity. It is readily understandable to those skilled in the art, however, that between different server types, the determination of relative processing capacity is largely dependent upon the particular workload environment, since certain types of applications are better suited to UNIX servers while others are more efficiently managed on S/390 servers. Accordingly, to better model a consolidation effort which may require the conversion of processing capacity between different server types, it is required that the TPM metric be subjected to a sliding scale adjustment that better reflects the relative processing capacities of the various platforms.

The result of step 609 is the incremental increase to server type 2 capacity based upon the proposed migration of the percentage of server type 1 capacity 610 expressed as (DELTA $C_2$). This additional type 2 server capacity is added 611 to the value for type 2 capacity $C_2$ (current) determined in step 602 to derive the resultant new server type 2 capacity $C_2$ (new) in step 613.

Next the new server type 2 capacity $C_2$ (new) is used to derive 614 the cost associated with the operation of the type 2 server after the migration of the type 1 server capacity. This cost is determined in a manner consistent with the operation that was performed in step 604 to arrive at $\$_2$ (current). The derived values of $C_2\$_2$ (new) (613 and 614) are combined 615 with the derived value to $C_1\$_1$ (new) (612) to produce the total capacity and operating costs after the proposed migration $C_{tot}\$_{tot}$ (new) 616.

In a preferred embodiment, additional factors relating to the usage of particular server types may ba factored into the determination. For example, in the cost determination steps 603 and 614, the industry average data on availability per server type may be incorporated into the calculation to achieve a more precise approximation of the true operation costs for each server type.

Referring back to the input steps 601a–601c it will be recalled that the user was prompted to provide the current and the projected data related to any of the number 601a, users 601b, or costs 601c per server type. The forward looking portion of this input in a preferred embodiment attempts to discern the changes in each server type over a five year period. The requirement for this information is premised upon the well-known notion that the cost associated with the hardware 601c1, software 601c2 and support 601c3 of a server platform each experience different variations over time. For example, for a given server type after an initial investment of acquisition capitol to purchase the bulk of the hardware, the hardware costs 601c1 can typically be expected to decrease rapidly over time, whereas the costs for personnel to support 601c3 the IT system increases markedly over time and the costs of software required to run the system 601c2 typically marginally increases over time.

As the CONSAVE tool use is used by an increasing population of customers, the data provided as industry averages throughout the process is continually refined, making the tool an increasingly precise estimator of the potential benefits of the business solution for the customer.

Figure 7:
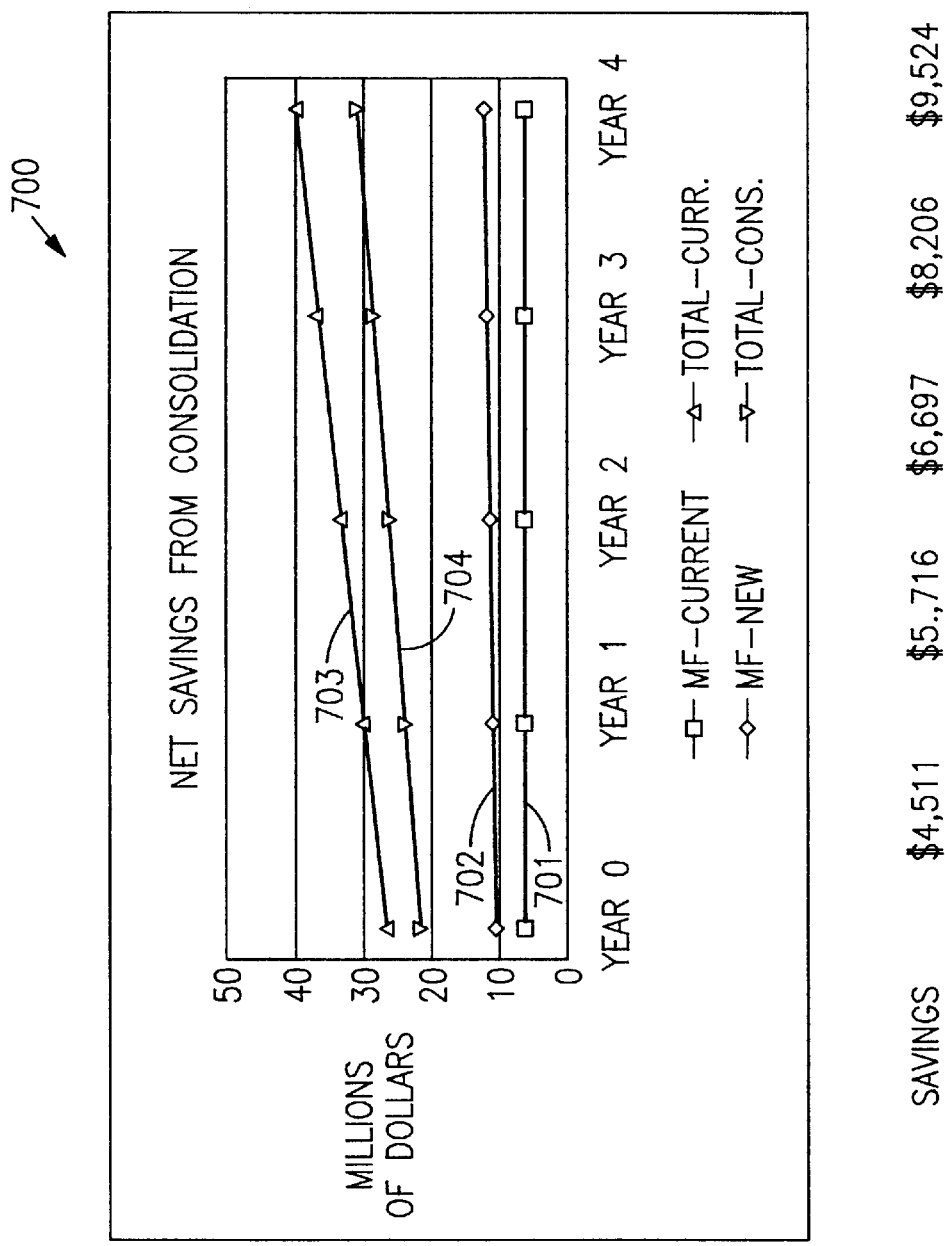
FIG. 7 shows a table of exemplary results from the consolidations savings tool.

Turning now to FIG. 7 we see an illustrative graphical output from an execution of the CONSAVE tool 506. The graph 700 plots $\$_2$ (current) 701, $\$_2$ (new) 702 and $\$_{tot}$ (current) 704 and $\$_{tot}$ (new) 703. From the graph 700 it can be seen that additional investment in type 2 servers has reduced the total operating cost for the customer's IT system as a result of the efficiencies gleaned from the consolidation effort.

Once a qualified participant has agreed to proceed with the BSA the assessment of the business solution needs of the customer begins in earnest 507.

Figure 8:
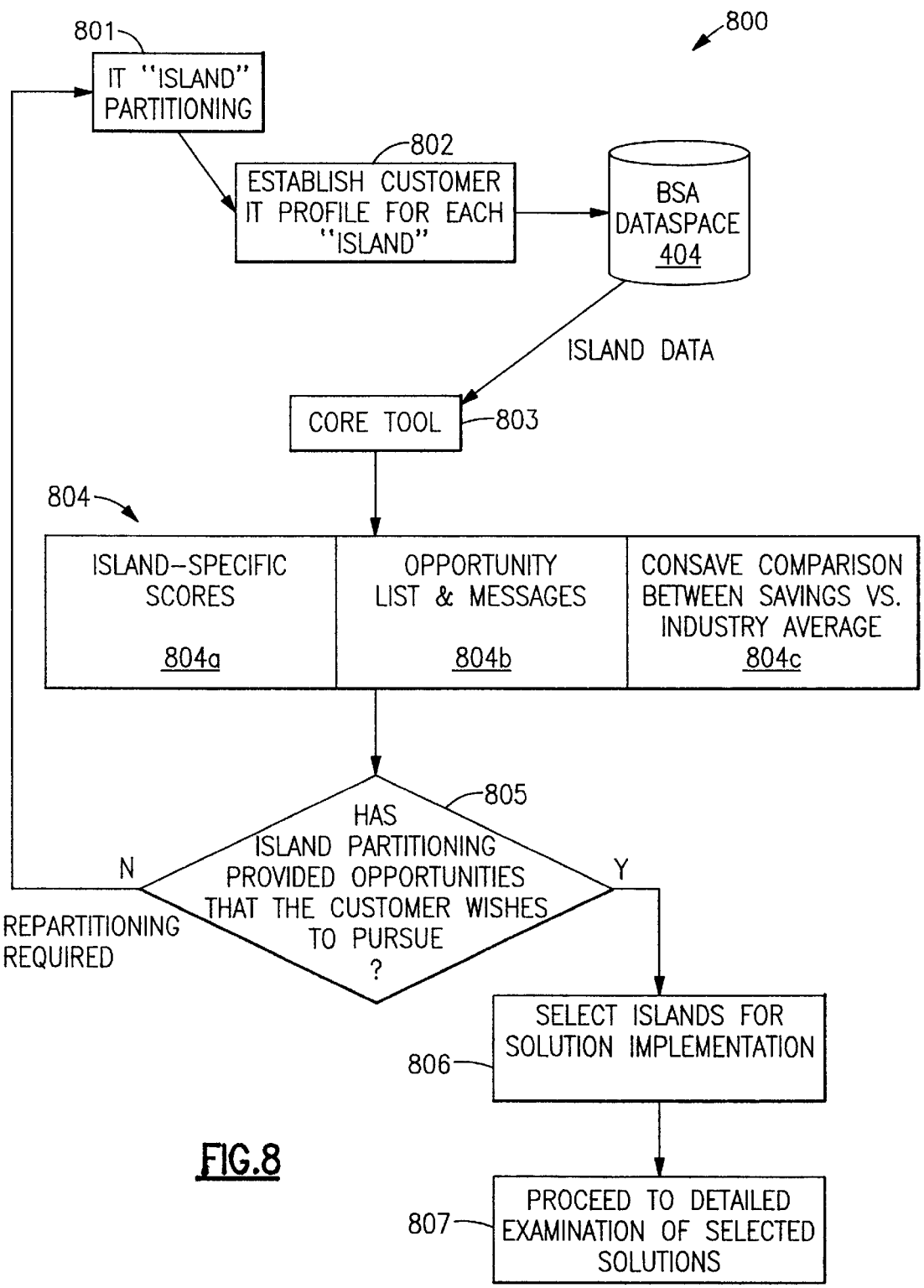
FIG. 8 illustrates the project selection process portion of the business solution assessment.

Turning now to FIG. 8, the portion of the business solution assessment process relating to profiling the qualified customer 203, and generating the ordered list of potential projects 204 are presented in greater detail via a flow diagram which will be referred to as the project selection process 800.

In order to undertake the proposed customer solution, it is necessary, especially in enterprises having sizable IT environments, to partition the IT infrastructure into segments which are recognizable to the customer, and manageable in scope. Accordingly, the first step in the project selection process 800 involves the identification of so-called "islands of IT" 801.

An island in the context of this description can be viewed as a group of IT resources which have a logical reason for being viewed and analyzed as a single entity. The objective is to partition the customer's environment into manageable groupings of IT resources so as to facilitate the identification and implementation of solutions, as well as to enable the solution provider to view the customer's IT environment from the customer's perspective. It follows then, that the success or failure of such an solutions undertaking depending largely upon the proper scope and sizing of the islands.

Should the islands be defined in a narrow manner, the resulting solution will not produce results which justify the customer's involvement in the undertaking, alternatively, if the islands are defined too broadly, the requisite analysis and development work require to implement a solution becomes formidable and the project duration will not be contained.

While there are numerous ways in which to partition the customer's IT environment, the typical partitioning is done along already existing boundaries defined by business process, organizational, geographic or financial lines. For example, it may be expedient to partition a customer's IT infrastructure commensurate with the various business processes undertaken by the customer, such as insurance claim processing, ERP applications, order entry processes etc. Alternatively, an enterprise may lend itself to islands of IT partitioned by geographic boundaries defined by campuses, or by the consolidation of multiple data centers. It is quite typical for an enterprise to present more than one natural boundary along which this type of partitioning may occur, and the present invention would accommodate such multiple partitioning. In such instances, however, great care must be exercised to ensure that the complexity of the groupings do not produce an excess of island partitions which complicates and extends the duration of the project selection process 800. More often, it will be beneficial to choose one boundary for partitioning these islands.

After the islands have been identified 801 it is next necessary to gather certain information about the identified islands so as to establish a profile 802 of customer's IT environment along the partitioned island lines. Customer profiling per island is performed in a manner similar to the computer-based question and answer format implemented for the qualification step 505. In fact, the answers obtained during the qualification process 500 including the data gathered in the database 404 from responses to the qualification questions 504 and to data added to the database 404 as a result of the responses to the questions from the CONSAVE tool 506 are combined with responses received as answers to the questions posed as part of the customer profiling step 802 and together these data from updated data space 404 serve as island input to a so-called BSA CORE tool 803.

The customer profiling step 802 entails a set of questions which are designed to elicit the type of information which, in addition to the information gleaned from the qualification process 500 will assist in completing the project selection process 800. Typically, this information includes quantitative and qualitative responses to customer specifics characteristics relating to the environment and culture, hardware and software platforms, management and staffing responsibilities, etc. of an enterprise. An exemplary listing of such customer profiling questions follows below:

TABLE 2

Customer Profiling Questions:

Account Related Information

Date
Company Name
Company Sponsor
Account No.
Address
Marketing Rep.
Phone No.

TABLE 2-continued

Customer Profiling Questions:

Customer Information

Date
Name
Primary Contact
Title
Address
Phone No.
Business Priorities

Top strategic Priorities over next year
Issues/Challenges with current
IT infrastructure
Trending toward centralization/
decentralization, why?
No. of servers by platform
Server growth rate
Operational Costs
IT budget
Availability requirements
Preferred platform for new apps
Current H/W & S/W environment
S/390 Hardware -

CPUs
DASD
Tape
S/390 Software -

O/S
Database subsystem
Transaction monitors
Security
Storage management
Key apps
UNIX Hardware -

CPUs
DASD
Tape
UNIX Software -

O/S
Database subsystem
Transaction monitors
Security
Storage management
Key apps
Network environment types
O/S
Database subsystem
Transaction monitors
Security
Storage management
Key apps The island partitions 801 and the resultant customer profile per island information 802 are added to the database 404 along with data provided during the qualification process 500 and along with the answers to the customer questionnaire and the input from the customer to the CONSAVE tool 506. The combined information is passed as island data to the core tool 803.

The BSA core tool 803 utilizes the island data input to create an opportunity score 804a for each island, as well as a related opportunity list for each island and a set of qualitative messages including tool-generated observations regarding each quantitatively scored island 804b. For instance, the core tool 803 may identify an attractive opportunity to implement an S/390 solution within an identified island, however the absence of any S/390 skill within that island would mean that the solution may either entail moving the workload to another island having the requisite hardware (or alternatively out-sourcing the workload), software and skill-base or selling the customer on establishing the required infrastructure within that island. The particular process implemented by the BSA core tool is subsequently addressed in FIG. 9.

The core tool will also implement the same process as undertaken for the CONSAVE tool 506, however in this instance the customer will supply all of the required input information rather than relying on the tool to "fill in the blanks" with industry averages. The tool will also generate an industry average profile of the same consolidation effort. The result of this portion of the core tool 803 is a comparison of the savings from the consolidation effort as opposed to what the industry average saving for such an endeavor might be 804c.

Based upon the output 804 of the core tool, a determination is made as to whether the scored island includes opportunities for which the customer wishes to pursue solutions 805. The determination is based to a large extent upon whether the islands were properly partitioned and the determination may be an automated observation that the scores do not differ per island to a meaningful degree to permit the selection of a particular island for solution implementation. Alternatively, the determination 805 may be premised upon the qualitative aspects of the core tool output 804 or alternatively may simply be a product of the customer's input that they are not interested in implementing solutions for the identified islands. In these instances, the process loops back to the partitioning step 801 and a new boundary is selected for selecting the islands of IT, thereafter the process 800 is repeated.

In step 806 the customer selects one or more scored islands for solution implementation. Finally, in step 807, with the island(s) selected, the process proceeds to the detailed examination of the selected islands(s) which will be subsequently described via reference to FIG. 10.

In many instances it may prove useful to define the profile information in step 802 in a manner that facilitates the simple re-partitioning of the islands of IT along several different boundaries. For example, if in profiling step 802 each island is defined by business-related boundaries, the information for each island may include pointers relating that information in each profiled island to known partitions based on geographic-related boundaries, thereafter if it is determined that a re-partitioning is required in step 805, the geographic partitions may be simply assembled and profiled from the existing business-defined island profiles and the process repeated. Alternatively, if the customer did not object to the additional upfront work, the profiles may be initially established 802 to include means for re-partitioning based upon all potential boundaries for island partitioning, and the process 800 could be iteratively repeated until the customer selects a resultant scored island(s) 806 for solution implementation.

It will further be appreciated that irrespective of the strategy for defining the islands in step 802, certain aspects of the customer profiling undertaking are global in nature and transcend any pre-defined boundaries along which the profiling may be directed. For example, over-arching customer objectives with regard to such areas as cost reduction, World Wide Web enablement, increased availability etc., are likely to be viewed by the customer as having the same importance irrespective of whether they are being assessed in relation to a defined business boundary or a defined geographic boundary or another boundary. These global objectives are defined in step 802 and are further illustrated in the subsequent detailed discussion of the CORE tool function.

Figure 9:
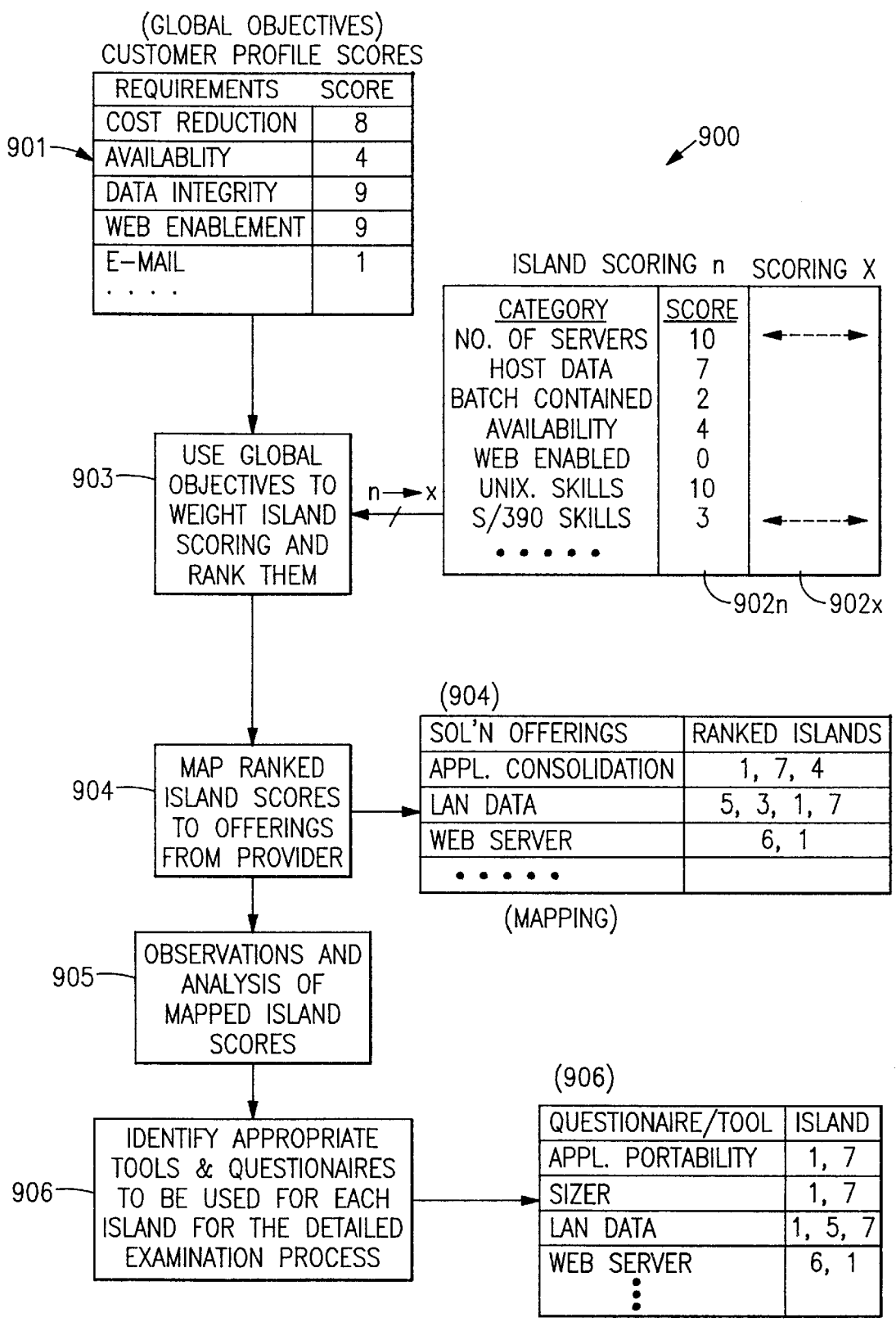
FIG. 9 depicts a detailed process flow for the business solution assessment core tool.

Turning now to a more detailed analysis of the function of the CORE tool 803, FIG. 9 illustrates the flow for the performance of the operations previously described with regard to step 803. Step 901 illustrates the assignment of scores to the previously defined global IT objective information which is part of the island data input to the CORE tool and which has been generated as a result of the customer profiling step 802. The additional island-specific information generated as part of the profiling step 802 for each defined island (i.e., islands n–x for example) is scored in step 902n–902x. In this instance the global profile scores relate to customer objectives 901 such as cost reduction, Web enablement etc. whereas the scored island-specific metrics 902n–902x relate to characteristics of the particular defined IT boundary such as a scoring for the number of servers, skills associated with the S/390 platform, skill associated with the UNIX platform, experienced availability etc.

In step 903, the scored global objectives 901 are used to weight the scored island-specific IT metrics. The weighing is applied in conjunction with the scoring of the global objectives, so that, for example, with a customer who has cost reduction as his highest ranked global objective metrics such as the number of servers per island and S/390 and UNIX skills could receive a higher weighing factor than less cost-sensitive metrics such as World Wide Web enablement. The weighted island scores can now be used to rank each island.

In step 904 the ranked weighted islands are then mapped against offerings from the provider so as to illustrate the type of opportunities associated with each offering. Thus, for example, the provider may notice a grouping of islands that may map to a particular offering such as consolidation whereas far fewer islands are mapped to other offerings. The figure shows an exemplary mapping in tabular form also labelled as 904.

In step 905 the resultant ranked weighted island scores having been mapped against provider offerings and are now analyzed for certain "observations" relating to the ultimate implementation of solutions for the customer. These "observations" are undertaken by the computer system and may range from the identification of actions which are required to undertake a particular opportunity, to cautions regarding potential cross-island opportunities. For example, a high score associated with number of servers may suggest a consolidation within the island, however the lack of platform-specific skills may render the consolidation within that island difficult (i.e., it would entail outsourcing or developing the skill), the tool would be implemented so as to recognize the availability of the requisite skills within another island and may provide a text generated observation pointing toward migration of the resource to the appropriate island to achieve the cost reduction goal of the customer. Many analytical implementations may be undertaken in step 905 which are considered to be within the scope of the present invention. For example, the patterns generated by the CORE tool may be compared to the results stored results of previous iterations of the BSA undertaken with other customers or with pre-defined models having their data stored in the database 404. This comparison may be undertaken with the aid of data mining tools such as on-line analytical processing (OLAP) tools to discern commonality among the results and previous identified opportunities.

Prior to undertaking the detailed examination 206 portion of the BSA process 200, in step 906 the CORE tool identifies the appropriate questionnaires and tools to utilize for each island in conjunction with the mapping of the weighted scores therefor. An exemplary illustration of this identification is shown as in the figure also labelled 906. This facilitates and initiates the selection 806 of one or more solutions applied to one or more islands enabling the participants in the BSA to proceed to the final portion of the process, the detailed examination process 1000 as depicted in FIG. 10.

Figure 10:
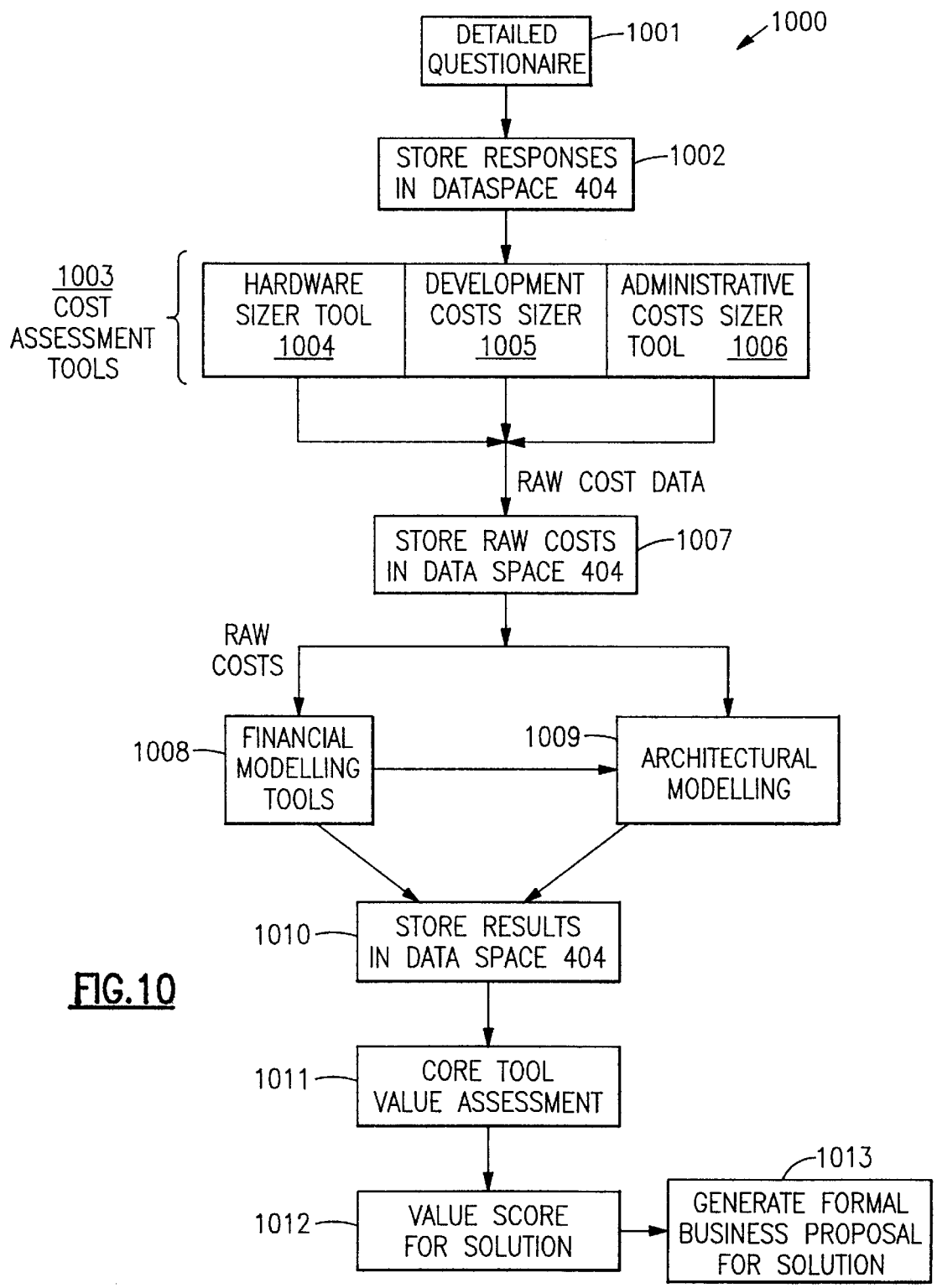
FIG. 10 illustrates the detailed examination process portion of the business solutions assessment.

Turning now to FIG. 10 a high-level process flow for the detailed examination process is illustrated. Upon passing through step 806 and 807 the provider and customer have selected one or more projects for further detailed examination. The CORE tool in step 906 has provided a listing of the requisite processes, questionnaires and tools necessary for such a detailed examination, such that, the process flow through the detailed examination process 1000 may be considered as being defined in step 906.

Notwithstanding the selection process 906 for the specific undertaking, the detailed examination process 1000 possesses some general characteristics which exist regardless of the specific solution offering undergoing detailed examination. Beginning with step 1001 the customer is directed to answer detailed questions related to the particular solution(s) that has been selected. The questions comprising the detailed questionnaire presented in step 1001 are cataloged within the computer system and may preferably reside in the database 404. The results of the foregoing CORE tool analysis 906 may be utilized in selecting the appropriate sets of questions to present to a specific customer. For example, a customer for which a consolidation solution is being investigated may be presented with a set of questions specific to the type of consolidation activity undergoing investigation, which set of questions may be cataloged as server consolidation questions. The CORE tool 803 may further indicate that the same customer has significant cost concerns in implementing this consolidation solution or alternatively that the customer does not possess the requisite technical experience to accommodate the consolidation. In such instances, the presentation of questions 1001 in light of this data gleaned from use of the CORE tool 803 would be implemented so as to further investigate these areas by identifying other appropriate sets of questions to present to the customer.

The responses to the questions presented to the customer 1001 are stored in the database 404 in step 1002. The database now includes nearly all of the customer-specific information which is required to implement the solution analysis. It will be understood that this is the very information that may be used as input for the modelling tasks undertaken by the CONSAVE and CORE tools in previous stages of the BSA process, and furthermore that as the BSA process is repeatedly performed, the value of the information stored in the data space 404 and its usefulness in modelling IT solutions for other customers will continue to grow.

The information stored in the data space 404 is next used as input to a set of tools designed to assess the cost 1003 of implementing the solution. The tools include a sizer 1004 for determining the costs of the hardware and associated licensed software included in the solution implementation, a tools for evaluating the development costs 1005 of implementing the solution and a tool for determining the costs of the administration 1006 required to accomplish the solution. Each of these tools will be described in greater detail below.

The hardware cost of the undertaking is assessed by a sizer tool in step 1004. The hardware cost is essentially the cost of any and all additional computing capacity required by the solution. An example would be the number of S/390 capacity measured in millions of instruction per second (MIPs) required to consolidate several servers onto the S/390 platform. In conjunction with this hardware transition cost assessment and additional assessment of associated software licensing expenses, incurred as a function of the hardware implementation is included in this step.

In addition to the hardware costs 1004 there are development costs associated with the work involved in implementing or porting of a solution to the customer's IT environment. The development workload assessment tool 1005 determines the costs involved in this process.

Finally, there are administrative costs 1006 associated with the solution implementation. Ideally, a customer would seek to minimize the required administrative costs via implementation of a solution, however, even in cases wherein the eventual cost of administration of a solution will be less that current administrative costs, initial expense associated with training and developing administrative procedures must be accounted for.

The results of each of the cost assessment tools is provided back to the database 404 in step 1007 as a "raw" cost for implementing the solution. The raw cost is devoid of certain financial modelling information such as the savings to be achieved by depreciation, the expense of inflation, the cost of loan-release financing, the cost of scrapping old equipment, or the income from selling or trading old equipment and environmental impacts. Each of these pieces of information is supplied either from data already stored in the database 404 or by user input into a financial modelling tool 1008 which serves to apply generally accepted accounting principles to the raw cost information so as to present an actual customer cost associated with the solution.

The output of the financial modelling tool 1008 and the database 404 serve as inputs to a process step 1009 wherein the architectural model for the particular solution is compared to data models of sample solutions (stored in the database 404). These data models represent the sample solutions or data patterns identified in the analytical processing step described for step 905. The comparison serves to determine whether the actual solution provides the same or substantially the same advantages as the model. The assessment may be based on cost, performance or any other parameters identified in selecting the particular model in 905. Favorable comparisons may result in the updating of the model whereas unfavorable comparisons will serve as indicators for instances when a particular sample solution may be inapplicable and may prompt a return to the selection step 906 or the detailed examination of a different selected solution. The outputs of the architectural modelling step 1009 as well as the financial modelling tools 1008 are provided in step 1010 to tables(s) in the data space 404.

At step 1010, the database 404 includes all of the required data for determining the actual cost of a solution implementation as well as for a comparison of the solution with the data models for the solution. In step 1011 it is next determined to what extent the solution implementation will provide value to the customer. This is accomplished by re-running the analysis portion of the CORE tool 1011 which, it will be recalled, compared the customers current IT environment with respect to the industry average. At this point 1011 it is now possible to provide a new comparison between the customer and the industry after incorporating the solution. The product of this determination is the assignment of a value score 1012 for the solution implementation, indicative of the efficacy of the solution for the customer.

Upon providing an acceptable value score a formal solution proposal can be generated 1013 by retrieving the particular solution implementation details from the database and incorporating them into a standard business solution proposal document. Moreover, in addition to the business solution proposal other deliverables from the BSA process including without limitation the results of any of the aforementioned analytic steps may be provided to the customer 1013.

Figure 11A:
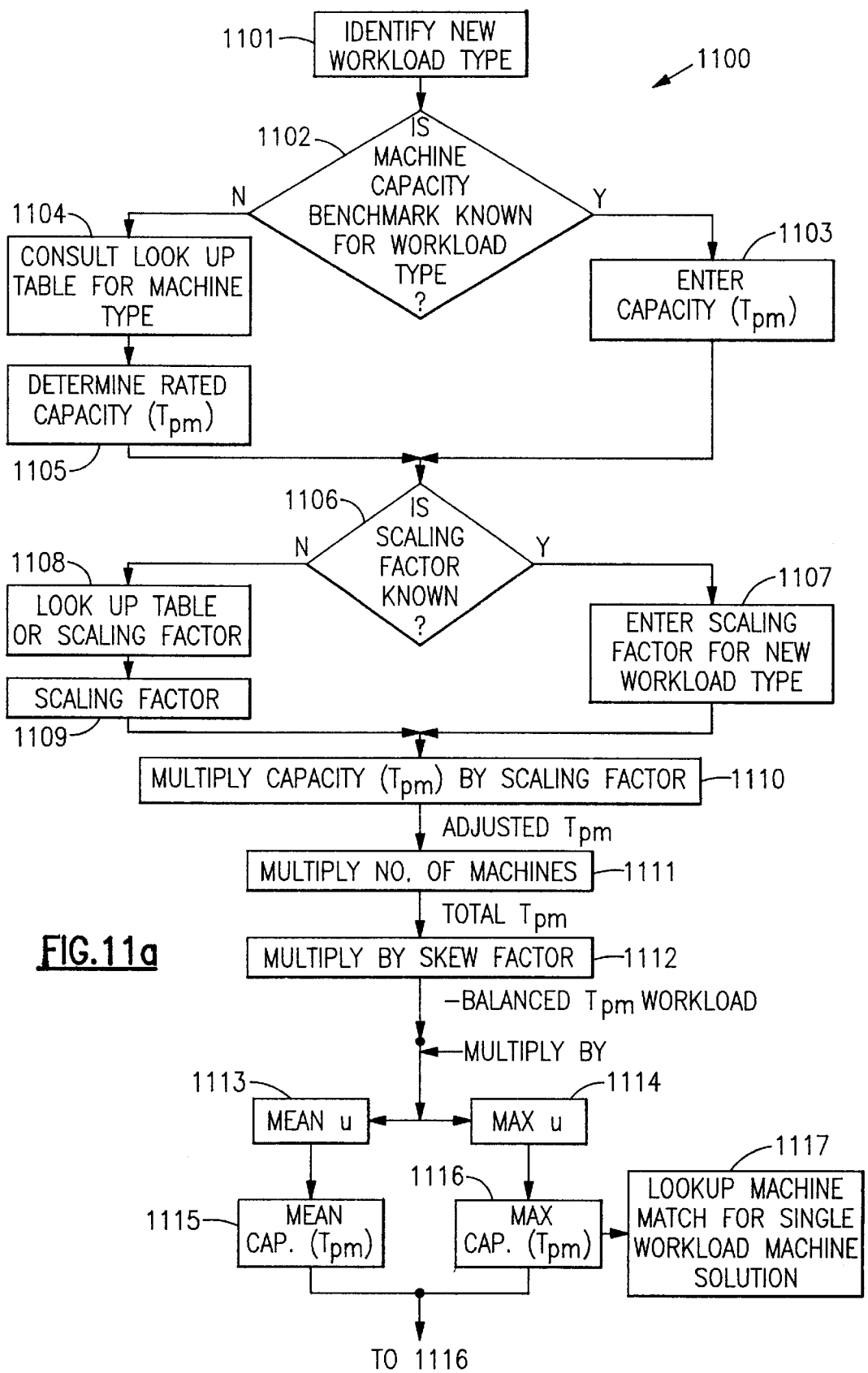
FIGS. 11a and 11b depict a detailed process flow for the hardware sizer tool.
Figure 11B:
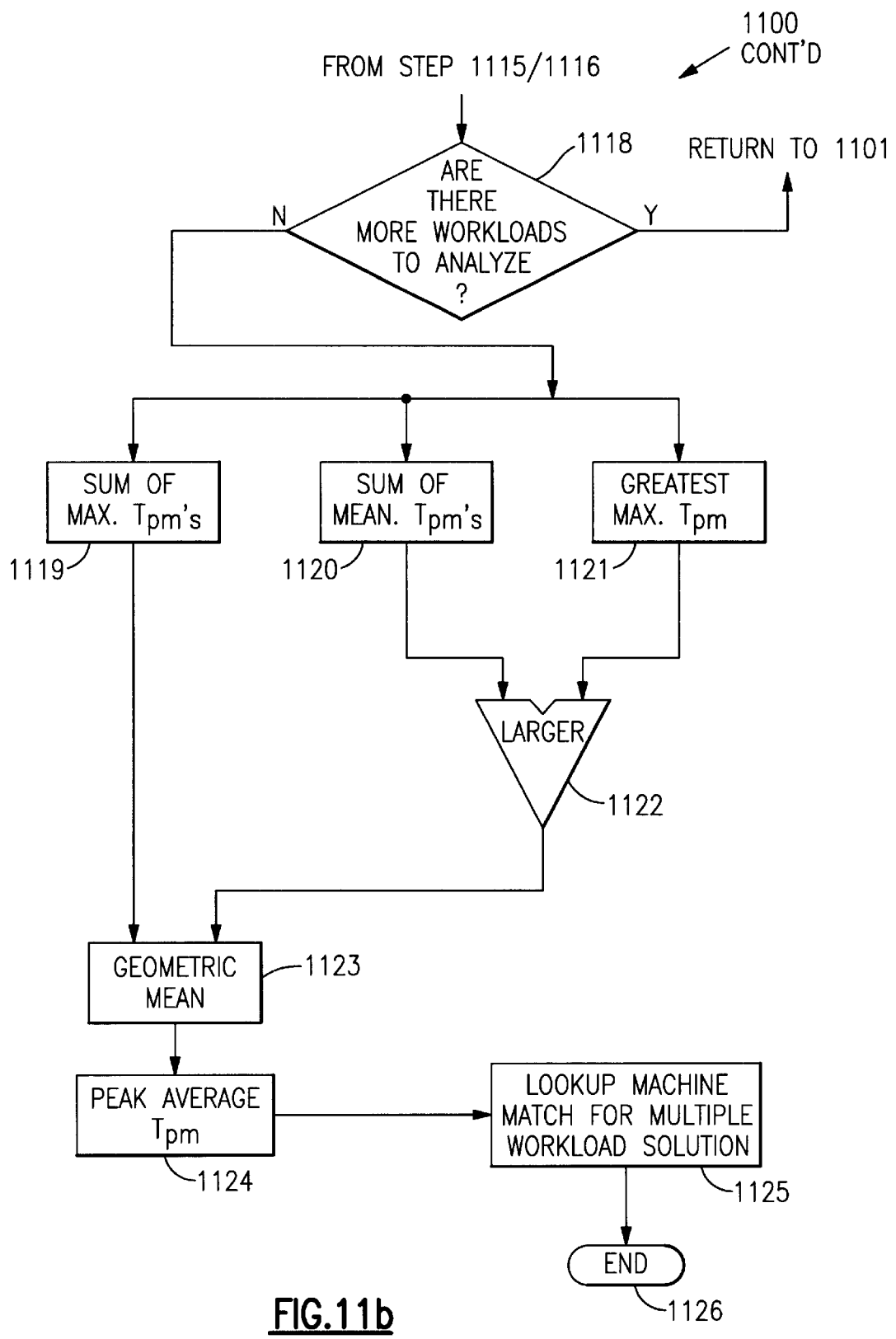

Turning back to the process steps defined under step 1003, FIG. 11 comprising FIGS. 11*a* and 11*b* taken together as a whole, shows the sizer tool operation 1004 in greater detail.

It will be recalled that the hardware sizer tool 1004 serves to determine the hardware costs of the solution including (in the case of a consolidation to the S/390 computing platform) the additional S/390 capacity required to handle the workload being migrated from another platform to the S/390 platform. The mechanism for achieving this determination is illustrated in the flow diagram 1100 wherein the process begins by entering the first workload type 1101, for example an SAP/R3 (SAP/R# is a trademark of SAP A.G.) workload migration.

Upon entering the workload type 1101 it is determined whether a workload benchmark for determining requisite machine capacity is known for the particular workload 1102. For example, in the preferred embodiment it is determined whether the transactions per minute (Tpm) rating for the workload is known. The Tpm rating is typically derived from published Tpmc ratings which represent a transactions per minute rating achieved by running the Transaction Processing Council (TPC-C) benchmark. An excellent source of this and other benchmark which are well known to those skilled in the art may currently be provided by Ideas International Corporation.

If the Tpm is known for the particular workload, the value is entered into the tool 1103, alternatively, if the value is not known, a lookup table may be utilized 1104 to secure the appropriate Tpm metric for the workload 1105.

Next it is determined whether a scaling factor is known for the workload 1106. A scaling factor represents a mechanism for adjusting the relative machine capacity between the native platform and the new platform to account for each of the platforms respective efficiencies at handling a particular workload with respect to the mean workload benchmark (i.e., Tpm) as determined in steps 1102–1105. For example, it is commonly recognized that an SAP workload will scale from UNIX machines from the UNIX platform to the S/390 platform at a slightly better rate than most industry standard benchmarks would indicate. Conversely, it is known that a computationally-intensive workload would scale from UNIX to S/390 at a slightly worse rate than indicated by industry standard benchmarks. This slight difference is represented by the scaling factor.

The scaling factor is determined empirically. Successive iterations of the BSA process create empirical data stored in the tables of the data space 404, which may be used to help properly set the scaling factor for such a consolidation effort. Accordingly, if the scaling factor is known for the particular workload type it is entered into the sizer tool 1107, and alternatively, if the scaling factor is not known it may be determined via a lookup table 1108 which relates the workload type to the empirically-derived scaling factor so as to provide a scaling factor 1109 for the particular workload to be migrated. The scaling factor is multiplied by the Tpm to adjust the Tpm for the particular workload migration 1110.

Since the workload to be migrated may exist on multiple physical machines, the next step is to multiply the adjusted Tpm (1110) by the number of machines (N) 911 to provide a total Tpm for the migration. Thus, if the SAP workload to be migrated is currently running on 5 UNIX platform machines the adjusted Tpm would be multiplied by 5.

The resultant total Tpm is next multiplied by the skew factor 1112. The skew factor represents the potential for the workload to be asymmetrically distributed across multiple machines such that one or more of the machines experiences different processing capacity requirements in accommodating the workload. A variety of calculations which are known to those of skill in the art, exist for determining this type of workload skew, in the preferred embodiment the following algorithm is implemented:

$$Skew=1/(1-s(N-1))$$

Where: s=an imbalance factor representing the percentage of workload that is not evenly distributed across the machines and N represents the number of machines as determined in step 1111.

The skew factor is multiplied by the total Tpm to provide the balanced total Tpm which represents the Tpm represented by the workload to be migrated less the additional processing capacity (Tpm) that would be required to accommodate the workload skew. The notion here is that by consolidating multiple instances of a workload onto a single machine, the overcapacity required to process the workload skew is no longer a factor to be considered in managing the migrated workload.

The balanced total Tpm is next multiplied by both a mean utilization factor 1113 (mean u) and a maximum utilization factor 1114 (max. u). The utilization factor (u) represents the amount of rated machine capacity (i.e., Tpm for the workload) that is actually used by the customer over time. The mean utility 1113 for a 24 hour period of use represents the average capacity of the machine devoted to the workload over that period, whereas the maximum utility 1114 for the same period represents the peak capacity devoted to that workload during the same period.

The product of the mean utility 1113 multiplied by the balanced total Tpm produces the mean Tpm 1115 and the product of the maximum utility 1115 multiplied by the balanced total Tpm produces the maximum Tpm 1116. The mean Tpm and maximum Tpm respectively represent the average capacity and peak capacity utilized by the workload.

If it were desired to migrate a given workload from a native platform to a new platform wherein the migrated workload will be the only workload resident on the new platform (i.e., a single workload machine implementation), the newly determined maximum Tpm 1116 would be the appropriate capacity to be used to size the target machine for the migration. Accordingly, in step 1117 the maximum Tpm determined in 1116 is mapped against a look up table or otherwise mapped to determine an equivalent target machine for such a single workload machine implementation. This step 1117 is repeated for each workload to be consolidated such that if it is ultimately determined that one or more workloads is not to be migrated to a multiple workload machine, the migration solution for single workload machine implementation will be readily apparent for each workload.

Next in step 1118 in FIG. 11*b*, it is determined whether any other workload need to be analyzed. If there are other workload which require analysis the process loops back to step 1101. Alternatively, when all workloads which are to migrated have been analyzed, the next three steps 1119, 1120 and 1121 respectively entail the determination of the sum of the maximum Tpm's (1119), the sum of the mean Tpm's (1120) and the largest instance of the maximum Tpm (1121).

In step 1122 the sum of the mean tpms from step 1120 and the largest instance of the maximum Tpm from step 1121 are compared and the largest of the two values is selected.

In step 1123, the geometric mean of the sum of the maximum Tpm's 1119 and the result of step 1122 is calculated to produce the peak average Tpm 1124.

The peak average Tpm value is then used to determine the capacity of the multiple workload machine implementation 1125 and the process is ended 1126. Obviously, once this capacity is determined a target machine may be selected for the consolidation project as previously described herein and by other known means.

It will further be recalled that the hardware sizer tool 1004 accounted for the costs of items such as the costs of licensed software required for the consolidation effort. This value is arrived after the machine determination is made via the process 1100 since the cost of the software via the license is often calculated based on the size of the machine, for example on a "per MIPs" or "per user" basis.

Figure 12:
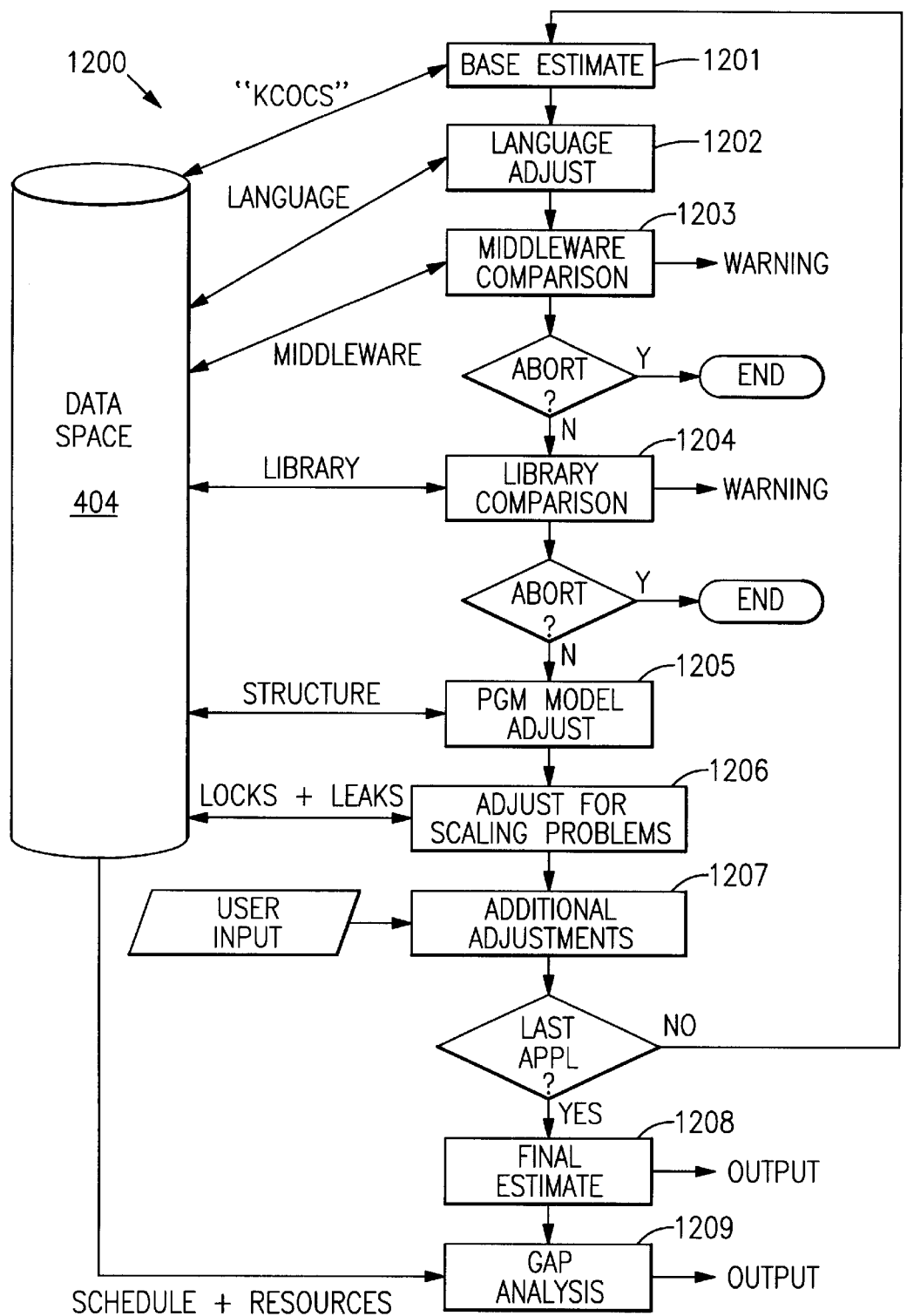
FIG. 12 depicts a detailed process flow for the workload development assessment tool.

Turning now to FIG. 12 we are presented with a detailed process flow 1200 for the workload development assessment tool 1005. It will be recalled that the workload development assessment tool is used to calculate development costs associated with the work involved in the implementing or porting of a solution to the customer's IT environment. An overview of the implementation of this determination is presented as flow diagram 1200.

Initially, it will be recalled that information regarding the customer's IT environment has been previously gathered at various points throughout the BSA process. Data space 404 comprises, in a preferred embodiment, a table or tables including information specific to the customer's IT environment, such as the languages implemented thereon, the distribution and levels of skills, availability of development tools etc. The data space 404 further includes information pertaining to the types of applications existing in the customer's IT environment which may be ported in a consolidation solution.

The process 1200 may be thought of at a high level as relating the specific existing factors to the customer's IT environment (skills, languages, tools etc.) to the specific factors of the application to be migrated (size, memory utilization, performance requirements, languages, compliance with standards, etc.) to arrive at a cost estimate for the migration undertaking for each application.

The process 1200 is run for applications which are to be migrated. In step 1201 the basic size of the program is estimated by the customer in terms of "klocs" or thousands of lines of code. This determined program size is multiplied by a factor previously determined empirically to provide a base estimate of the labor involved in migrating the application. In step 1202 the result of step 1201 is adjusted by language factors to account for differences in the ease of porting. For example, if the program comprises one-half C programming language code and the other half C++ programming language code, the result of the lines of code sizing determination 1201 is multiplied by the adjustment factor for each segment of code:

$$Lang=(0.5*Cfactor+0.5*C++factor).$$

(wherein Cfactor–is the language factor for the C code and C++factor is the language factor for the C++ code.)

In step 1203 any middleware required by the application is compared to the available middleware for the target platform, which information has preferably been previously determined and is stored in the data space 404. If the required middleware is not available a flag is raised and the user is given the opportunity to abort the process or proceed assuming that the middleware will be ported.

In step 1204 any program or object libraries required are compared to the libraries available for the target platform. As was the case in step 1203, this information is preferably stored in data space 404. Furthermore, as in Step 1203 the user is given the opportunity to abort or continue on mismatches.

In step 1205 the programming model is examined, and adjustment is made to the estimate. The programming model may directly impact the porting estimate in a variety of different ways. For example, it is known that the "heavy process" architectures like OS/390 and AS/400 can have trouble with "process model" applications which create and destroy many processes dynamically. Getting such applications to acceptable performance levels can involve additional development work in the port. On the other hand applications implemented using a "threads" programming model can do much better with such architectures and require less porting effort.

In step 1206 the estimate is adjusted to include resolution of scaling problems in the application which exist regardless of platform. Known scaling problems like memory leaks and the use of spin locks are taken into account. This step is particularly important when the reason for the port is growth. There are existing tools which can detect memory leaks or the customer may be having trouble with a leak and therefore knows about it. The user can choose to include running a leak detector and other analysis tools on the existing platform as part of the estimated porting effort.

In step 1207 the user is given the opportunity to add programming effort estimates for rearchitecting pieces of the application. In many consolidation efforts there is considerable pathlength to be removed by creating direct file or memory sharing interfaces where network and gateway interfaces existed in the distributed solution. Estimates for making these adjustments are highly application dependent and therefore need to be done separately and then added in step 1207.

Steps 1201–1207 are repeated for each application under consideration. In step 1208 the resulting time and resource estimate is presented to the user both in total and by application. Additionally a breakdown of adjustments made for each application is provided.

In step 1209 the customer's resources are compared to the resources required to do the estimated work on the desired schedule and the gap, if any, is identified. The resulting output is used to develop services proposals negotiating with service providers and contract programmers or adjusting the customers resources.

Throughout the process 1200 the data space 404 is continually accessed to provide information relevant to each of the enumerated steps 1201–1208. It is further contemplated that the data space 404 further includes application porting models, which are based upon previously available data from previous porting efforts and commercially available data and which are continually refined as the porting process is repeated. The continual use and refinement of these models provides and increasing accurate tool for determining the application porting effort.

Having described our invention herein, that which is considered to be new and for which protection via Letters Patent is desired is specified in the following claims:

1. A method for determining the value to an enterprise of a proposed information technology modification, the method comprising the steps of:
   a. partitioning the information technology resources of said enterprise into a first set of segments;

b. creating a profile of the information technology resources included within each of said partitioned segments, said profiles for said segments including information on the information technology priorities of the enterprise;

c. deriving an opportunity score associated with the implementation of said proposed information technology modification within each profiled segment and matching the information technology priorities of the enterprise with the complexity of implementing the proposed modification for each segment; and d. assessing the opportunity score for each segment to determine whether the partitioning was effective and if not repeating step a–d, partitioning said information technology resources into a second set of segments in step a.

2. A method according to claim 1 wherein each of said partitioned segments possesses at least one common property, said common property facilitating the analysis of the segment independent from said other segments.

3. A method according to claim 2 wherein said common property for each of said partitions is selected from the set of: geographic location, business process, business organization, financing, applications, hardware platform, skills, and user sets.

4. A method according to claim 1 wherein said profiles for said segments include information regarding the computer hardware, computation workloads, network infrastructure and skilled personnel within each of said partitioned segments.

5. A method according to claim 1 wherein said derived opportunity score for each segment represents the relative value to the enterprise from the proposed information technology modification for said segment.

6. A method according to claim 1 wherein step c further includes the step of creating a qualitative assessment for at least one of the scored segments.

7. A method according to claim 1 wherein if the proposed information technology modification is a consolidation of machines within one of said partitioned segments, the method further includes the steps of:

generating an industry average estimate of savings for a similar consolidation;

generating an estimate of savings based upon the profile of information technology resources within the partitioned segment; and comparing said estimate with said industry average estimate.

8. A method according to claim 1 further including the step of:

selecting at least one of said partitioned scored segments for implementation of said proposed modification.

9. A method according to claim 8 wherein said selecting step can be premised upon qualitative aspects of said selected segments irrespective of the opportunity scores thereof.

10. A method according to claim 1 wherein in step d, said determination that said partitioning has not been effective may be reached, if said opportunity scores for said segments do not differ sufficiently.

11. A method according to claim 1 wherein said partitioning step includes partitioning the information technology resources of said enterprise into a plurality of sets of segments and choosing at least one of said plurality of sets of segments and wherein if in step d it is determined that the chosen sets are not effectively partitioned then step d includes choosing at least one of said remaining sets and repeating steps a–d.

12. A method according to claim 11 wherein each information technology resource of said enterprise may be designated as a member of one of said segments in any number of said plurality of sets of segments.

13. A method according to claim 1 wherein said partitioning includes the creation of all possible sets of segments and wherein the opportunity scores for each segment in all of said sets of segments are compared to determine the most valuable segment for said proposed modification.

14. A program storage device readable by a digital processing apparatus and tangibly embodying a program of instructions executable by the digital processing apparatus to perform method steps for determining the value to an enterprise of a proposed information technology modification, the method steps comprising:

a. partitioning the information technology resources of said enterprise into a first set of segments;

b. creating a profile of the information technology resources included within each of said partitioned segments, said profiles for said segments including information on the information technology priorities of the enterprise;

c. deriving an opportunity score associated with the implementation of said proposed information technology modification within each profiled segment and matching the information technology priorities of the enterprise with the complexity of implementing the proposed modification for each segment; and d. assessing the opportunity score for each segment to determine whether the partitioning was effective and if not repeating step a–d, partitioning said information technology resources into a second set of segments in step a.

15. A program storage device according to claim 14 wherein each of said partitioned segments possesses at least one common property, said common property facilitating the analysis of the segment independent from said other segments.

16. A program storage device according to claim 15 wherein said common property for each of said partitions is selected from the set of: geographic location, business process, business organization, financing, applications, hardware platform, skills, and user sets.

17. A program storage device according to claim 14 wherein said profiles for said segments include information regarding the computer hardware, computation workloads, network infrastructure and skilled personnel within each of said partitioned segments.

18. A program storage device according to claim 14 wherein said derived opportunity score for each segment represents the relative value to the enterprise from the proposed information technology modification for said segment.

19. A program storage device according to claim 14 wherein method step c further includes the method step of creating a qualitative assessment for at least one of the scored segments.

20. A program storage device according to claim 14 wherein if the proposed information technology modification is a consolidation of machines within one of said partitioned segments, the method steps further include:

generating an industry average estimate of savings for a similar consolidation;

generating an estimate of savings based upon the profile of information technology resources within the partitioned segment; and comparing said estimate with said industry average estimate.

21. A program storage device according to claim 14 further including the method step of:

selecting at least one of said partitioned scored segments for implementation of said proposed modification.

22. A program storage device according to claim 21 wherein said selecting method step can be premised upon qualitative aspects of said selected segments irrespective of the opportunity scores thereof.

23. A program storage device according to claim 14 wherein in method step d, said determination that said partitioning has not been effective may be reached, if said opportunity scores for said segments do not differ sufficiently.

24. A program storage device according to claim 14 wherein said partitioning method step includes partitioning the information technology resources of said enterprise into a plurality of sets of segments and choosing at least one of said plurality of sets of segments and wherein if in method step d it is determined that the chosen sets are not effectively partitioned then method step d further includes choosing at least one of said remaining sets and repeating steps a–d.

25. A program storage device according to claim 24 wherein each information technology resource of said enterprise may be designated as a member of one of said segments in any number of said plurality of sets of segments.

26. A program storage device according to claim 14 wherein said partitioning includes the creation of all possible sets of segments and wherein the opportunity scores for each segment in all of said sets of segments are compared to determine the most valuable segment for said proposed modification.

27. A system for determining the value to an enterprise of a proposed information technology modification, the system including:

a partition containing the information technology resources of said enterprise into a first set of segments;

a profile for each of said partitioned segment of the information technology resources included within each of said partitioned segment, said profiles for said segments including information on the information technology priorities of the enterprise;

an opportunity score associated with the implementation of said proposed information technology modification within each profiled segment, the opportunity score matching the information technology priorities of the enterprise with the complexity of implementing the proposed modification for each segment; and a second set of segments partitioned from said information technology resources when the opportunity score for each segment was not effective.

* * * * *